(12) United States Patent
Mori

(10) Patent No.: US 8,416,352 B2
(45) Date of Patent: Apr. 9, 2013

(54) ALIGNMENT MARKER, DISPLAY DEVICE USING THE SAME, AND FABRICATION METHOD THEREOF

(75) Inventor: Makoto Mori, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 925 days.

(21) Appl. No.: 12/493,563

(22) Filed: Jun. 29, 2009

(65) Prior Publication Data

US 2010/0053617 A1    Mar. 4, 2010

(30) Foreign Application Priority Data

Jun. 27, 2008 (JP) ................................ 2008-169494

(51) Int. Cl.
G02F 1/1335    (2006.01)
(52) U.S. Cl.
USPC .................................................... 349/15
(58) Field of Classification Search ............ 349/15
See application file for complete search history.

(56) References Cited

U.S. PATENT DOCUMENTS 5,633,719 A * 5/1997 Oehlbeck et al. ............ 356/401
2003/0035220 A1 * 2/2003 Hawver .......................... 359/626

FOREIGN PATENT DOCUMENTS

| JP | 5-188498 | 7/1993 |
|---|---|---|
| JP | 05-188498 | 7/1993 |
| JP | 08-211515 | 8/1995 |
| JP | 10-149110 | 6/1998 |
| JP | 11-015086 | 1/1999 |
| JP | 11-352441 | 12/1999 |
| JP | 2000-194277 | 7/2000 |
| JP | 2003-075773 | 3/2003 |
| JP | 2003-195216 | 7/2003 |
| JP | 2008-040126 | 2/2006 |

OTHER PUBLICATIONS

Japanese Patent Office issued a Japanese Office Action dated Apr. 30, 2010, Application No. 2008-169494.

* cited by examiner

Primary Examiner — Wen-Ying P Chen
(74) Attorney, Agent, or Firm — Young & Thompson

(57) ABSTRACT

An alignment marker includes first marker element pieces for a first viewpoint and second marker element pieces for a second viewpoint different in plan shape. The first and second marker element pieces are respectively formed by dividing marker elements in such a way as to be equal in width to a predetermined marker element pitch. These pieces are arranged at the marker element pitch along an optical image separation direction of the optical image separation element. A predetermined number of the adjoining first and second pieces constitute one repetition cycle. A width of the repetition cycle is in accordance with an arrangement pitch of constituent elements of the optical image separation element. An existing optical image separation element can be used without the formation of the markers thereon and the alignment operation can be performed with a usual aligning and bonding apparatus.

10 Claims, 19 Drawing Sheets

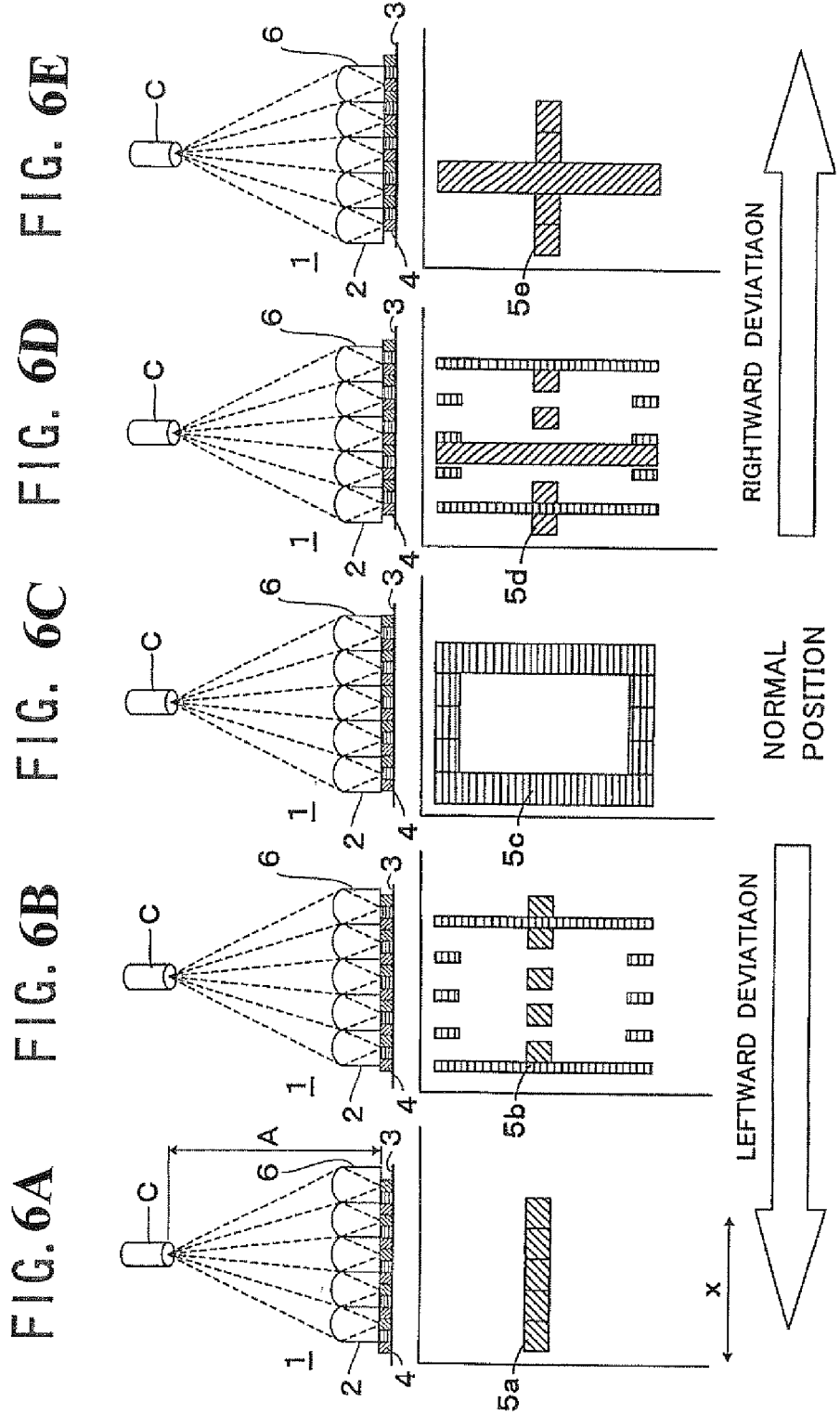

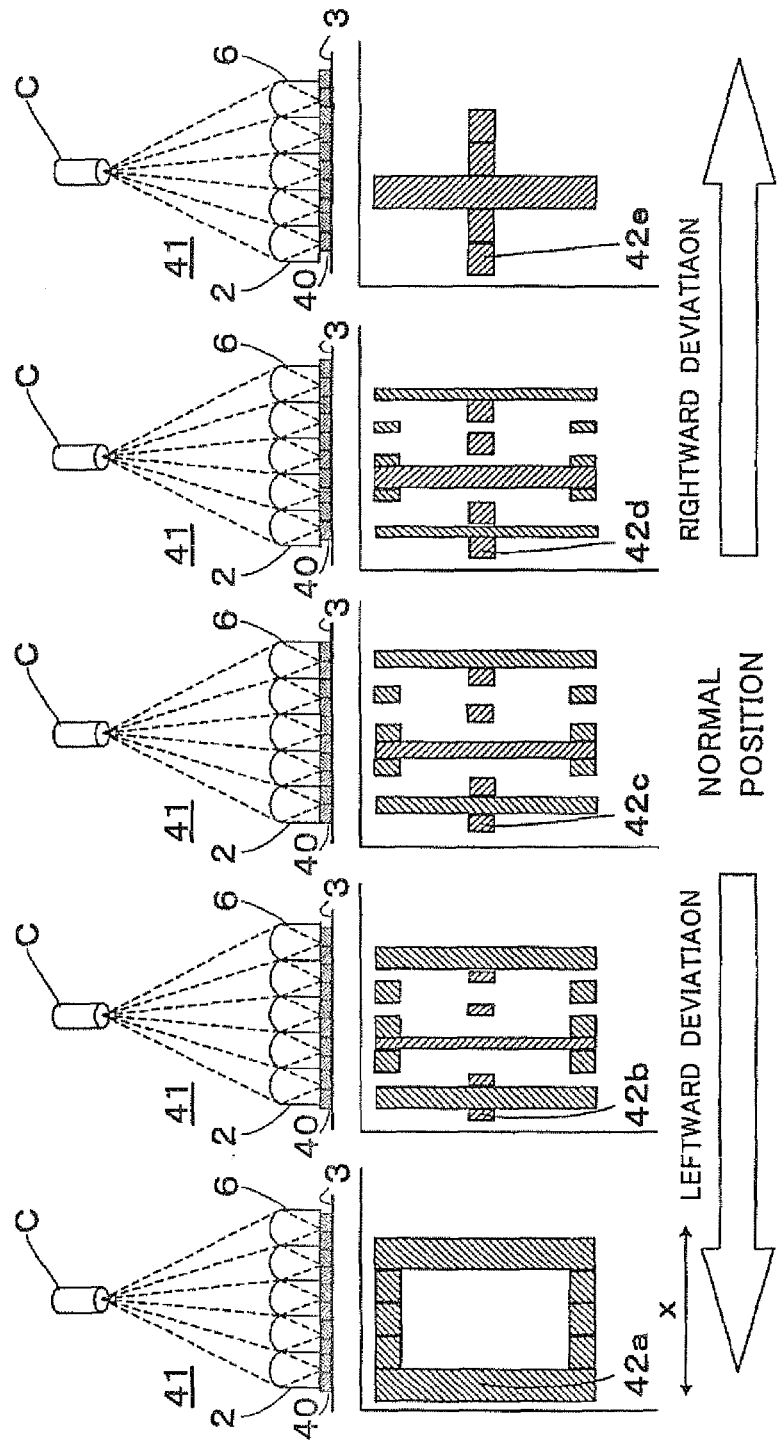

FIG. 20

ALIGNMENT ACCURACY TO REPETITION CYCLE
OF MARK ELEMENT PIECES WHEN LENS ELEMENT
PITCH IS DEFINED AS 1

| REPETITION CYCLE OF MARK ELEMENT PIECES | ALIGNMENT ACCURACY |
|---|---|
| 2 | 0.165 |
| 3 | 0.110 |
| 4 | 0.080 |
| 5 | 0.065 |
| 6 | 0.050 |

ALIGNMENT MARKER, DISPLAY DEVICE USING THE SAME, AND FABRICATION METHOD THEREOF

BACKGROUND OF THE INVENTION

1. Field of the Invention

The present invention relates to an alignment marker, a display device using the alignment marker, and a fabrication method of the display device. More particularly, the invention relates to an alignment marker used for positional alignment between an optical image separation element, such as a lenticular lens, and a display panel in the fabrication process of a display device that displays different images for respective viewpoints (e.g., an autostereoscopic three-dimensional display device); a display device using the alignment marker; and a fabrication method of the display device.

2. Description of the Related Art

In recent years, the number of Liquid Crystal Display (LCD) devices mounted on small-sized electronic equipment such as projectors, mobile phones, and so on, has been increased rapidly to make good use of their features such as low power consumption, reduced weight, and low profile. On the other hand, value-added products that are produced by adding some values to LCD devices have been developed also. An example of the value-added products is an autostereoscopic three-dimensional display device having a capability of displaying stereoscopic three-dimensional images using an optical element that separates images by dividing incident light for different viewpoints (i.e., an optical image separation element or an optical divider element). With the autostereoscopic three-dimensional display device of this type, a viewer can perceive stereoscopic three-dimensional images with naked eyes without using any dedicated eyeglasses. It is common that a lens (e.g., a lenticular lens, a fly-eye lens, and so on) or a parallax barrier is used as the optical image separation element.

Now, conventionally, the positional alignment methods between a lens and a display panel used in the fabrication process of a display device that displays different images for respective viewpoints (e.g., an autostereoscopic three-dimensional display device) are divided broadly into three types.

The positional alignment method of the first type is a method where markers are respectively formed on the display panel and the lens and then, these markers are matched, thereby aligning the positions of the panel and the lens with each other. An example of this method is disclosed in the Japanese Patent Publication No. 5-188498 published in 1993, which is shown in FIG. 1.

With the positional alignment method of the first type, as shown in FIG. 1, positioning marks 101 are formed at predetermined positions on a display panel 100 and at the same time, positioning marks (not shown) are formed at predetermined positions on the surface of a lens 102 (a lenticular lens in the Publication No. 5-188498). Thereafter, mark images 105 of the positioning marks on the lens 102 and the positioning marks 101 on the display panel 100 are matched with each other, thereby aligning the positions of the panel 100 and the lens 102 with each other using the watching means 104 of a positioning apparatus 103 (see Abstract and FIGS. 1 and 4).

The positional alignment method of the second type is a method where incident light is irradiated to a lens to thereby form a light-collected image and then, the light-collected image thus formed is matched with one of markers formed on a display panel, thereby aligning the positions of the panel and the lens with each other. An example of this method is disclosed in the Japanese Patent Publication No. 10-149110 published in 1998 and another example thereof is disclosed in the Japanese Patent Publication No. 2000-194277 published in 2000. FIG. 2 shows the example of the method of the Publication No. 10-149110, and FIG. 3 shows the example of the method of the Publication No. 2000-194277.

With the positional alignment method of the second type shown in FIG. 2, an alignment marker 151 is provided at a predetermined position on a display panel 150 (a driver substrate in the Publication No. 10-149110). The alignment marker 151, which is located outside of the display region of the panel 150, comprises parallel straight lines arranged at predetermined intervals. Incident light 153 is irradiated to a lens 152 (a cylindrical lens formed on the opposite substrate in the Publication No. 10-149110) to thereby generate a light-collected image 154 on the panel 150 due to the light-collecting characteristic of the lens 152. Then, the light-collected image 154 thus generated is matched with a desired one of the straight lines of the alignment marker 151, thereby aligning the positions of the panel 150 and the lens 152 with each other (see Abstract, FIG. 4, and paragraphs 0020 to 0022).

With the positional alignment method of the second type shown in FIG. 3, an aligning and bonding apparatus 200 with the structure shown in FIG. 3 is used. On the table of the apparatus 200, a microlens substrate 204 and a LCD element 205 are stacked, as shown in FIG. 3. Thereafter, laser light emitted from a laser light source 201 is irradiated to the microlens substrate 204 by way of a half mirror 202 and a mirror 203 and concentrated, thereby forming optical spots on the underlying LCD element 205. Subsequently, while comparing the positions of the optical spots with the predetermined positions on the element 205 using monitoring televisions 207 for displaying the images from microscopes 206, the positions of the optical spots are matched with the predetermined positions on the element 205 (see Abstract, FIG. 1, and paragraphs 0042 to 0047).

The positional alignment method of the third type is a method where the position of a display panel and that of a lens are aligned with each other utilizing the change of state of a specific pattern seen by a viewer, where the pattern is formed outside the display region of the display panel. An example of this method is disclosed in the Japanese Patent Publication No. 11-352441 published in 1999 and another example thereof is disclosed in the Japanese Patent Publication No. 11-15086 published in 1999. FIG. 4 shows the example of the method of the Publication No. 11-352441, and FIG. 7 shows the example of the method of the Publication No. 11-15086.

The positional alignment method of the third type shown in FIG. 4 is used for production of a printing matter 250 comprising main image regions 251 and a rectangular frame-shaped gauge region 252 formed to surround the main image regions 251. A gauge 253 is printed in the gauge region 252. The gauge 253 comprises a pattern formed by straight lines with predetermined widths which are arranged in parallel to each other at predetermined intervals. With this method, printing registration is checked using the gauge 253 printed on a printing paper in the above-described manner.

When printing registration is not matched, the respective lines forming the gauge 253 are not printed apparently apart from each other. Thus, printing is performed even on the portions to be blank existing among the adjacent lines and as a result, the entire gauge 253 is destroyed or collapsed. On the other hand, when printing registration is matched, the respective lines forming the gauge 253 are printed apparently apart from each other and the entire gauge 253 is not destroyed nor collapsed. In this way, printing registration can be checked easily with high accuracy by finding whether the gauge 253 is in the printing state.

Moreover, in the case where the printing matter 250 is seen by way of a sheet-shaped lenticular lens in the step of sticking the lenticular lens onto the printing matter 250. When bonding registration is not matched, moire fringes are generated in the gauge region 252 and therefore, the image of the gauge 253 obtained from a sensor comprises light and shade whose values are deviated from their predetermined ones or whose values are dispersed. When bonding registration is matched, moire fringes are not generated in the gauge region 252 and therefore, the image of the gauge 253 obtained from the sensor comprises a uniform density. In this way, bonding registration can be checked easily by finding which one of the images is seen (see Abstract, FIGS. 1 and 2, and paragraphs 0023 to 0028).

With the positional alignment method of the third type shown in FIG. 7, linear black lines 301 are respectively placed at the specified positions of a synthesized image 300 that comprises a plurality of images having parallax arranged in the respective unit pixels on the same plane. For example, as shown in FIG. 7, the black lines 301 are respectively placed at the left and right end positions of the synthesized image 300, to which the cylindrical lens elements (not shown) forming a lenticular lens are respectively opposed. The black lines 301 are located outside of the display region (or the effective region). Thereafter, positioning is carried out in such a way that one of the black lines 301 is seen in its entirety by way of the lenticular lens (not shown), thereby aligning the position of the lenticular lens and that of the synthesized image 300 with each other (see Abstract, FIGS. 8 and 9, and paragraphs 0022 to 0030).

With the related-art positional alignment method of the first type shown in FIG. 1, the position of the positioning marks 101 on the display panel 100 and that of the alignment marks on the surface of the lens 102 are matched. Therefore, it is necessary to form the alignment marks not only on the display panel 100 but also on the lens 102 with high accuracy. However, to form the alignment marks of this type, the photolithography, printing, stamping or ink-jet technique is generally used. This means that the formation process of the said alignment marks is likely to be affected by the surface irregularities of the base material on which the said markers are to be formed. Accordingly, it is difficult to form desired alignment marks on the surface of the lens 102 with high accuracy.

The alignment marks may be formed on the back of the lens 102. In this case, however, the positioning apparatus 103 needs to have the capability that alignment operation can be performed on both of the surface and back of the lens 102 to cope with the accuracy of the lens 102. This requirement raises the price of the positioning apparatus 103.

Moreover, with the related-art positional alignment method of the first type shown in FIG. 1, not only the high-priced positioning apparatus 103 is necessary due to the above-described reason but also the fabrication cost of the lens 102 is raised due to the requirement of formation of the alignment marks. Accordingly, there is a problem that the fabrication cost of a display device using the display panel 100 is increased.

With the related-art positional alignment method of the second type shown in FIG. 2, the light-collected image 154, which is generated on the display panel 150 by the incident light irradiated to the lens 152, and the alignment marker 151 formed on the display panel 150 are matched with each other, thereby aligning the position of the panel 150 and that of the lens 152. This means that no alignment marker is present on the lens 152. For this reason, an ordinary alignment apparatus is unable to be used and a specially-designed alignment apparatus for this method is necessary. Accordingly, there is a problem that the cost of the alignment apparatus is high.

Moreover, with the related-art positional alignment method of the second type shown in FIG. 2, there is a possibility that the light-collected image 154 generated on the display panel 150 with the lens 152 does not focus on correctly due to dispersion of the thickness of the lens 152, the panel 150 or the adhesion layer, which makes the light-collected image 154 unclear. For this reason, it is essential to make adjustment of the light source for individual display devices. As a result, there is a problem that it takes very long time for the alignment operation and thus, the productivity lowers.

With the related-art positional alignment method of the second type shown in FIG. 3 also, there is a similar problem to the above problem of the method of FIG. 2. Specifically, the laser light emitted from the laser light source 201 is irradiated to the LCD element 205 by way of the microlens substrate 204, thereby forming the optical spots on the element 205. Thereafter, positional alignment is carried out while visually comparing the positions of the optical spots and the predetermined positions on the element 205 with each other. Accordingly, there is a problem that it takes very long time for the alignment operation and thus, the productivity lowers.

With the related-art positional alignment method of the third type shown in FIG. 4, the gauge 253 with a specific pattern is formed in the gauge region 252 which is located outside the display region (i.e., the main image regions 251) of the printing matter 250, and the positional alignment is carried out utilizing the light and shade of the images and the existence and absence of moire fringes. However, this method does not refer to the relative positional deviations along the image separation direction (i.e., the optical dividing direction) of the lenticular lens and the rotational direction thereof. For this reason, there is a problem that it takes very long time for the alignment operation and thus, the productivity lowers.

With the related-art positional alignment method of the third type shown in FIG. 7, the linear black lines 301 are respectively placed at the specified positions of the synthesized image 300 and then, aligning operation is carried out in such a way that one of the black lines 301 is seen in its entirety by way of the lenticular lens. Since this method also does not refer to the relative positional deviations along the image separation direction (i.e., the optical dividing direction) of the lenticular lens, there is a similar problem to that of the positional alignment method of the third type shown in FIG. 4.

SUMMARY OF THE INVENTION

The present invention was created to solve the above-described problems of the related-art positional alignment methods explained with reference to FIGS. 1 to 7.

An object of the present invention is to provide an alignment marker that makes it possible to use an existing optical image separation element (e.g., a lenticular lens) as it is without the formation of markers on the said optical image separation element and to perform the alignment operation between an optical mage separation element and a display panel with a usual aligning and bonding apparatus; a display device using the alignment marker; and a fabrication method of the display device.

Another object of the present invention is to provide an alignment marker that makes it possible not only to discriminate easily whether an optical image separation element and a display panel are aligned in position or not but also to know easily the direction and quantity of the positional deviation between the optical image separation element and the display panel in the case where they are not aligned in position; a display device using the alignment marker; and a fabrication method of the display device.

Still another object of the present invention is to provide an alignment marker that makes it possible to lower the fabrication cost of a display device comprising an optical image separation element and a display panel and to improve the productivity thereof; a display device using the alignment marker; and a fabrication method of the display device.

The above objects together with others not specifically mentioned will become clear to those skilled in the art from the following description.

(1) According to the first aspect of the present invention, an alignment marker is provided, which is designed to be formed on a display panel for positional alignment between an optical image separation element (e.g., a lenticular lens) and the display panel in the fabrication process of a display device comprising the optical image separation element and the display panel.

This alignment marker comprises:

first marker element pieces for a first viewpoint, which are formed by dividing a first marker element for the first viewpoint in such a way as to have widths equal to a predetermined marker element pitch; and second marker element pieces for a second viewpoint, which are formed by dividing a second marker element for the second viewpoint in such a way as to have widths equal to the marker element pitch;

wherein the first marker element and the second marker element are different in plan shape from each other;

the first marker element pieces and the second marker element pieces are arranged in a predetermined order at the marker element pitch along an optical image separation direction of the optical image separation element, thereby forming a pattern; and a predetermined number of the first marker element pieces and the second marker element pieces adjoining to each other constitute one repetition cycle (a group), a width of the repetition cycle being in accordance with an arrangement pitch (e.g., a lens element pitch) of constituent elements (e.g., cylindrical lens elements) of the optical image separation element.

With the alignment marker according to the first aspect of the present invention, the above-described structure is provided and therefore, when an image of the alignment marker formed on the display panel is picked up with a camera by way of the optical image separation element at a predetermined visual recognition distance, different states are visually recognized in accordance with whether the position of the optical image separation element and the position of the display element are aligned or not. For example, in accordance with whether the optical image separation element and the display element are aligned in position or not, different synthesized images are visually recognized. Alternately, in the case where the optical image separation element and the display element are aligned in position, no synthesized images are visually recognized (in other words, synthesized images disappear), and in the case where the optical image separation element and the display element are not aligned in position, synthesized images are visually recognized. For this reason, whether the optical image separation element and the display panel are aligned in position or not can be discriminated easily.

In addition, in the case where the optical image separation element and the display element are not aligned in position, different synthesized images are visually recognized in accordance with the direction and quantity of the positional deviation along the image separation direction. In other words, the synthesized images thus recognized vary according to the said direction and quantity of the positional deviation. Therefore, the direction and quantity of the positional deviation between the optical image separation element and the display panel can be known easily.

Accordingly, an existing optical image separation element as it is can be used without the formation of markers on the optical image separation element, and the positional alignment operation between the optical mage separation element and the display panel can be performed with a usual aligning and bonding apparatus.

Furthermore, as explained above, an existing optical image separation element and a usual aligning and bonding apparatus are usable, and whether the optical mage separation element and the display panel are aligned in position or not is discriminated in the above-described manner. Therefore, the discrimination operation can be carried out speedily and the positional deviation can be corrected promptly. This makes it possible to lower the fabrication cost of a display device comprising the optical image separation element and the display panel and to improve the productivity thereof.

(2) In a preferred embodiment of the alignment marker according to the first aspect of the present invention, the first marker element pieces and the second marker element pieces are alternately arranged along the image separation direction, and one of the first marker element pieces and one of the second marker element pieces, which are adjacent to each other, constitute the repetition cycle.

In this embodiment, the alignment marker comprises the first marker element pieces and the second marker element pieces only and therefore, there is an additional advantage that the structure of the marker is simplified.

(3) In another preferred embodiment of the alignment marker according to the first aspect of the present invention, third marker element pieces for a third viewpoint are additionally provided, wherein the third marker element pieces are formed by dividing a third marker element for the third viewpoint in such a way as to have widths equal to the marker element pitch;

the first marker element pieces, the second marker element pieces, and the third marker element pieces are arranged along the optical image separation direction, thereby forming the pattern; and one of the first marker element pieces, one of the second marker element pieces, and one of the third marker element pieces, which are adjacent to each other, constitute the repetition cycle.

In this embodiment, the third marker element pieces are included in addition to the first marker element pieces and the second marker element pieces. Therefore, although the structure of the alignment marker becomes slightly complicated than the case where only the first marker element pieces and the second marker element pieces are included, there is an additional advantage that the difference of the states visually recognized in accordance with whether the position of the optical image separation element and the position of the display element are aligned or not is more distinctive, and that the change of the synthesized images visually recognized in accordance with the direction and quantity of the positional deviation is more distinguishable.

(4) In still another preferred embodiment of the alignment marker according to the first aspect of the present invention, spaces, each of which having a width equal to the marker element pitch, are additionally provided;

the first marker element pieces, the second marker element pieces, and the spaces are arranged along the optical image separation direction, thereby forming the pattern;

and one of the first marker element pieces, one of the second marker element pieces, and one of the spaces, which are adjacent to each other, constitute the repetition cycle.

In this embodiment, the spaces are included in addition to the first marker element pieces and the second marker element pieces. Therefore, although the structure of the alignment marker becomes slightly complicated than the case where only the first marker element pieces and the second marker element pieces are included, it is simpler than the case where the third marker element pieces are additionally provided. Moreover, there is an additional advantage that the difference of the states visually recognized in accordance with whether the position of the optical image separation element and the position of the display element are aligned or not is more distinctive, and that the change of the synthesized images visually recognized in accordance with the direction and quantity of the positional deviation is more distinctive also.

(5) In the above-described embodiment of (4), it is preferred that when an image of the marker formed on the display panel is picked up with a camera by way of the optical image separation element at a predetermined visual recognition distance, no synthesized images are visually recognized in the case where the optical image separation element and the display element are aligned in position, and predetermined synthesized images are visually recognized in the case where the optical image separation element and the display element are not aligned in position.

(6) In the above-described embodiment of (3), it is preferred that the repetition cycle comprises two or more of the first marker element pieces, the second marker element pieces, and/or the third marker element pieces.

In this case, there is an additional advantage that positional alignment accuracy is improved compared with the case where the repetition cycle comprises the single first marker element pieces, the single second marker element piece, and the single third marker element piece.

(7) In the alignment marker according to the first aspect of the invention or the above-described embodiment of (2), it is preferred that each of the first marker element piece and the second marker element piece is obtained by scaling down its initial plan shape (1/a number of the first and second marker element pieces included in the repetition cycle) along the optical image separation direction.

(8) In the above-described embodiment of (3) or (6), it is preferred that each of the first marker element piece, the second marker element piece, and the third marker element piece is obtained by scaling down its initial plan shape (1/a number of the first, second, and third marker element pieces included in the repetition cycle) along the optical image separation direction.

(9) According to the second aspect of the present invention, a display device is provided, which displays different images for different viewpoints.

This display device comprises:
a display panel;
the markers according to the first aspect of the present invention or one of the above-described embodiments (2) to (8), which is formed on the display panel; and
an optical image separation element attached to the display panel.

With the display device according to the second aspect of the present invention, the marker according to one of (1) to (8) is formed on the display panel, and the optical image separation element is attached to the display panel. Therefore, because of the same reason as described for the marker according to the first aspect of the present invention, it is apparent that the same advantages as those of the marker are obtainable.

(10) In a preferred embodiment of the display device according to the second aspect of the present invention, the markers are arranged at three or more positions in a non-display region of the display device along a direction perpendicular to the optical image separation direction.

In this embodiment, since the markers are arranged at three or more positions, there is an additional advantage that positional alignment along the rotational direction is facilitated by matching the images generated from these markers.

(11) In another preferred embodiment of the display device according to the second aspect of the present invention, the optical image separation element comprises:
structural elements arranged along the image separation direction; and
an additional structural element whose optical image separation direction is perpendicular to the optical image separation direction of the optical image separation element;
wherein the display panel comprises an additional marker obtained by rotating the marker by an angle of 90° in a plane parallel to the display panel.

In this embodiment, there is an additional advantage that the quantity and direction of the positional deviation along the direction perpendicular to the image separation direction can be known in addition to the quantity and direction of the positional deviation along the image separation direction, thereby improving the productivity furthermore.

(12) According to the third aspect of the present invention, a method of fabricating a display device is provided, which is a method for fabricating a display device that displays different images for different viewpoints.

This method comprises:
forming the marker according to the first aspect of the present invention or one of the above-described embodiments (2) to (8) at a predetermined position on the display panel;
performing positional alignment between the display panel and an optical image separation element by utilizing an image of the marker visually recognized by way of the optical image separation element; and
fixing the optical image separation element on the display panel after completion of the positional alignment.

With the method of fabricating a display device according to the third aspect of the present invention, the optical image separation element is attached to the display panel in the above-described manner and therefore, it is apparent that the same advantages as those of the marker according to the first aspect of the invention are obtained because of the same reason as that described for the said marker.

(13) In a preferred embodiment of the method according to the third aspect of the invention, the markers are arranged at three or more positions in a non-display region of the display device along a direction perpendicular to the optical image separation direction.

In this embodiment, since the markers are arranged at three or more positions, there is an additional advantage that positional alignment along the rotational direction is facilitated by matching the images generated from these markers.

(14) In another preferred embodiment of the method according to the third aspect of the invention, the optical image separation element comprises:
structural elements arranged along the image separation direction; and an additional structural element whose optical image separation direction is perpendicular to the optical image separation direction of the optical image separation element;

wherein the display panel comprises an additional marker obtained by rotating the marker by an angle of 90° in a plane parallel to the display panel.

In this embodiment, there is an additional advantage that the quantity and direction of the positional deviation along the direction perpendicular to the image separation direction can be known in addition to the quantity and direction of the positional deviation along the image separation direction, thereby improving the productivity furthermore.

BRIEF DESCRIPTION OF THE DRAWINGS

In order that the present invention may be readily carried into effect, it will now be described with reference to the accompanying drawings.

FIGS. 6A to 6E are explanatory illustrations showing a method of fabricating a display device according to a first embodiment of the present invention, respectively, wherein the positional relationship between a lenticular lens and an alignment marker, and a synthesized image generated by picking up an image of the alignment marker on a display panel by way of the lenticular lens are shown.

FIGS. 14A to 14E are explanatory illustrations showing a method of fabricating a display device according to the third embodiment of the present invention, respectively, wherein the positional relationship between a lenticular lens and an alignment marker, and a synthesized image generated by picking up an image of the alignment marker on a display panel by way of the lenticular lens are shown.

FIG. 20 is a table showing the relationship between the repetition cycle of the marker element pieces (i.e., the number of the marker element pieces), and the alignment accuracy between the display panel and the lenticular lens sheet with respect to the said repetition cycle.

DETAILED DESCRIPTION OF THE PREFERRED EMBODIMENTS

Figure 1:
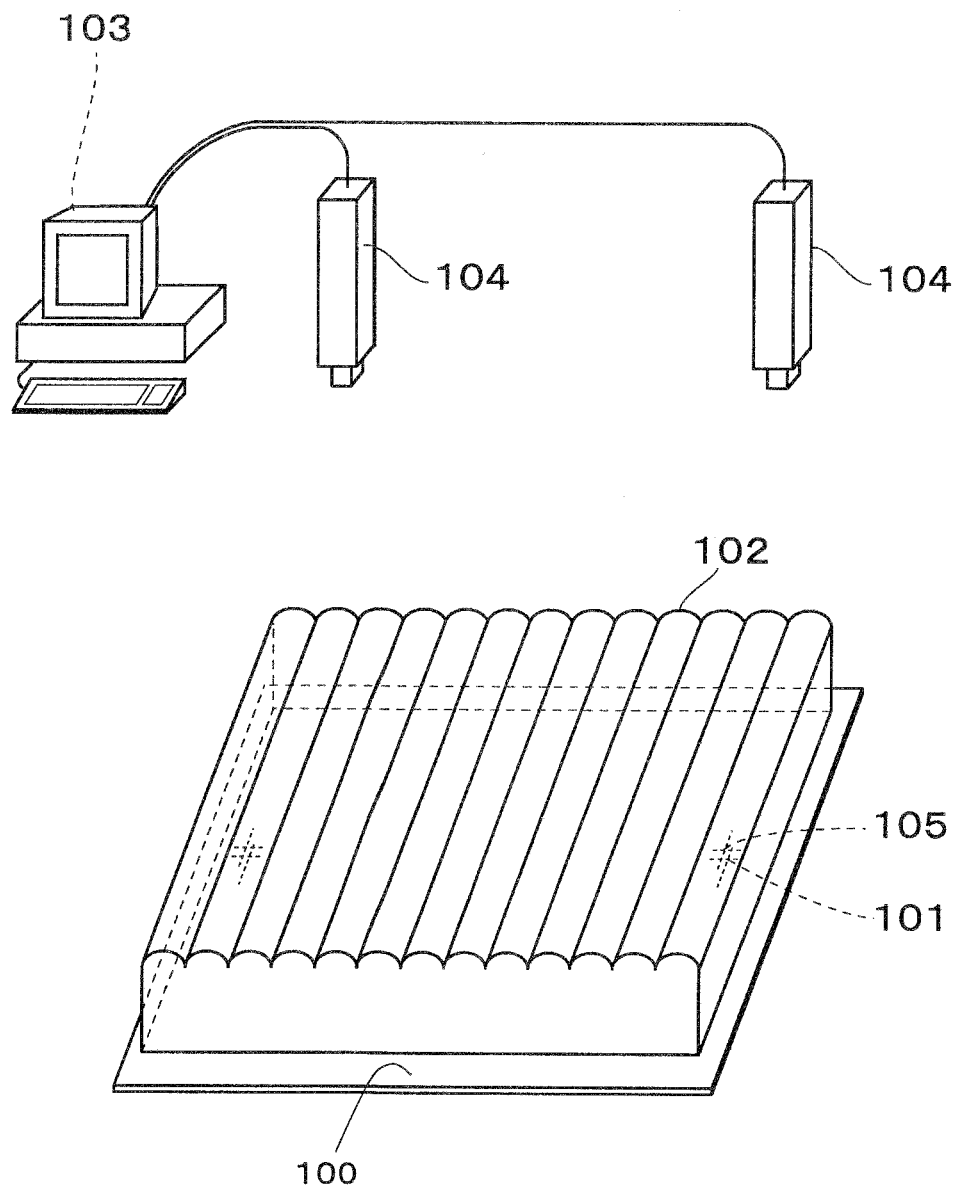
FIG. 1 is a schematic perspective view showing a related-art positional alignment method of the first type.
Figure 2:
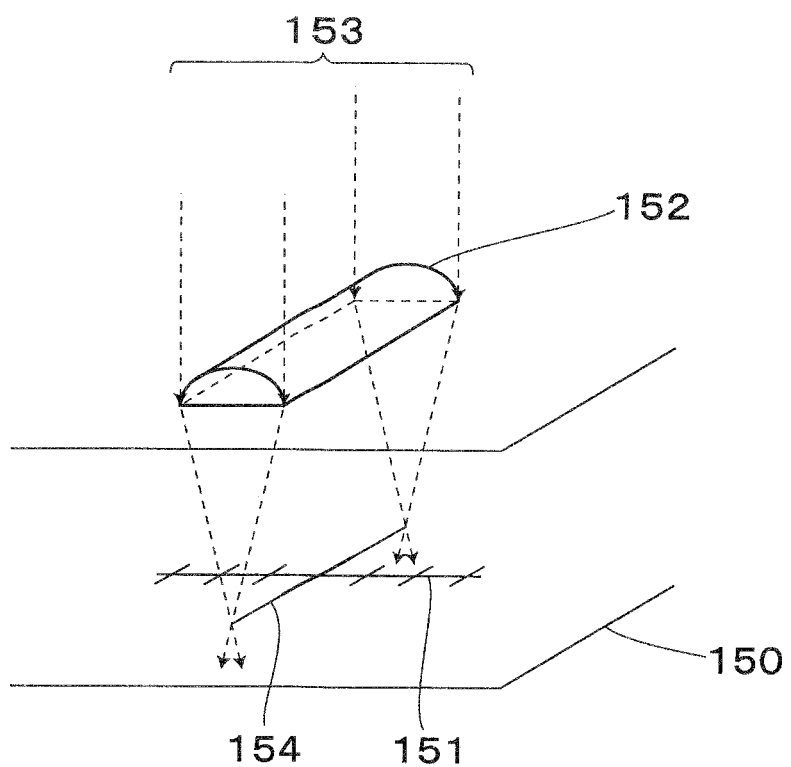
FIG. 2 is a schematic perspective view showing a related-art positional alignment method of the second type.
Figure 3:
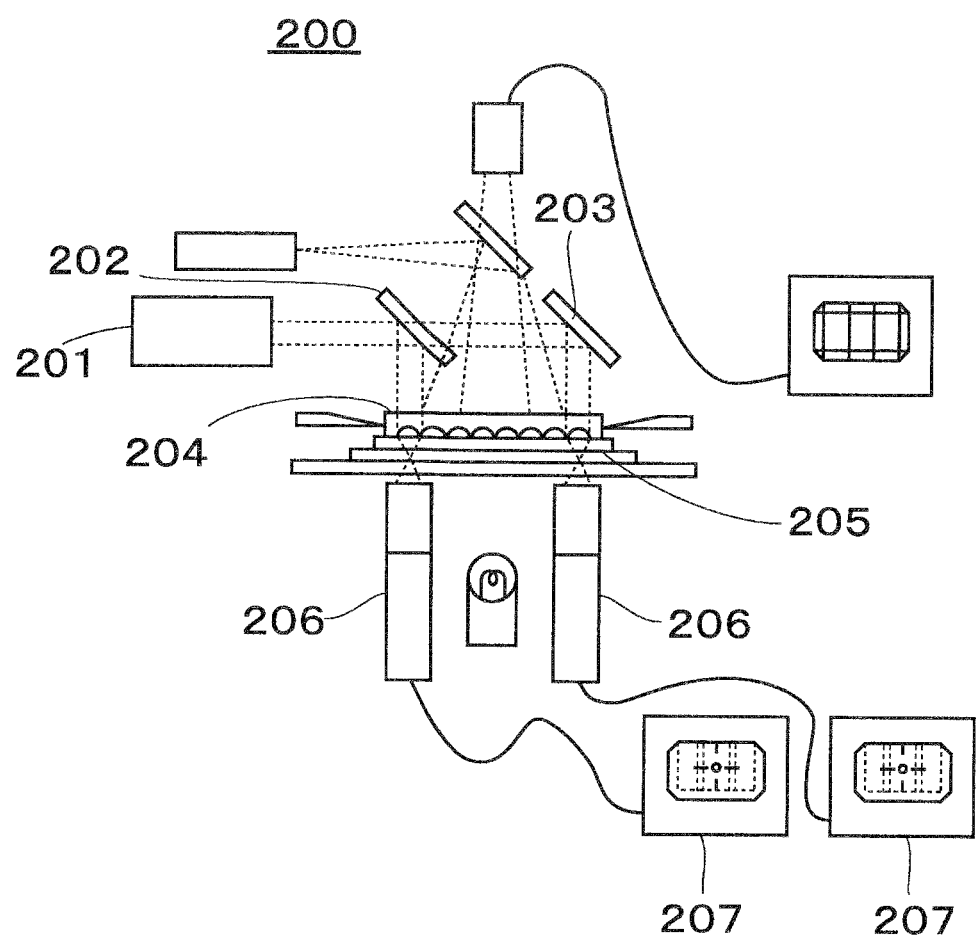
FIG. 3 is a schematic side view showing the aligning and bonding apparatus used in another related-art positional alignment method of the second type.
Figure 4:
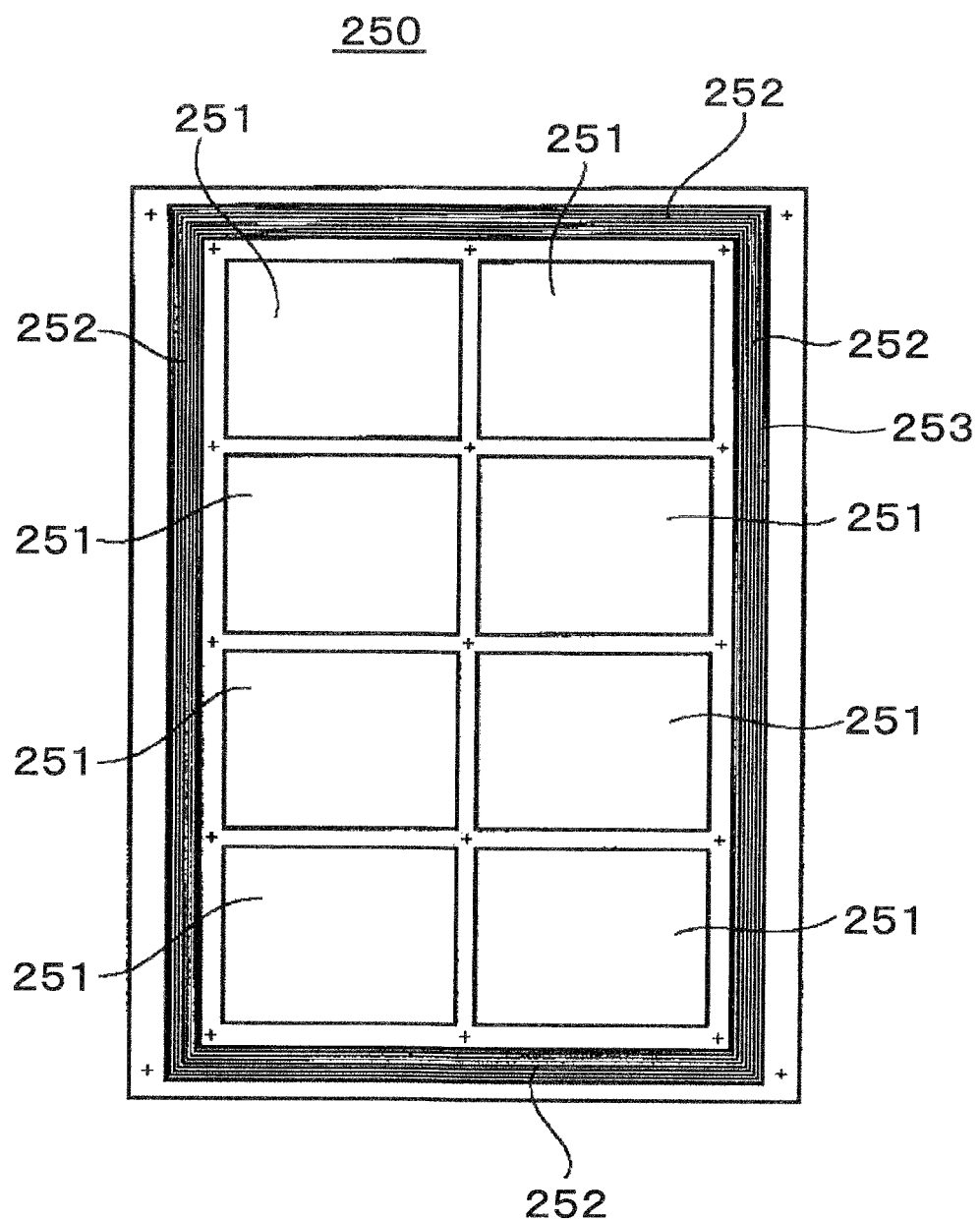
FIG. 4 is a plan view showing the structure of a printed matter used in a related-art positional alignment method of the third type.
Figure 5:
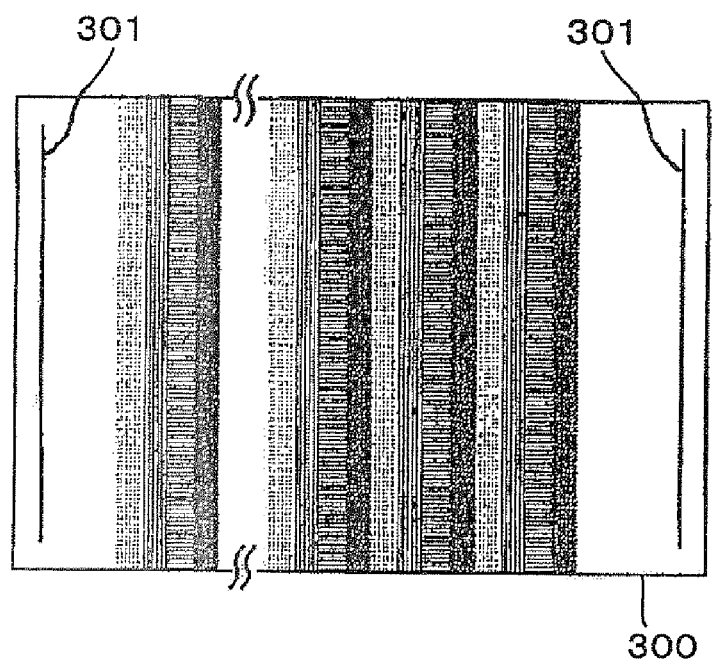
FIG. 5 is a schematic partial plan view showing the structure of a synthesized image used in another related-art positional alignment method of the third type.

Preferred embodiments of the present invention will be described in detail below while referring to the drawings attached.

First Embodiment

FIGS. 6A to 6E show respectively the positional relationship between a lenticular lens 2 and an alignment marker 4, and synthesized images 5a, 5b, 5c, 5d, and 5e generated by picking up images of the alignment marker 4 on a display panel 3 with cameras C by way of the lenticular lens 2 in a method of fabricating a display device 1 according to a first embodiment of the present invention.

A plurality of the markers 4 are formed on the display panel 3 at the corresponding positions to the alignment marks (not shown) of the panel 3 using the ink-jet, photolithography, printing, or stamping technique. Moreover, the markers 4 are located on the front surface of the panel 3 (e.g., on the Thin-Film-Transistor substrate side) in the first embodiment described here. However, the markers 4 may be located on the back of the panel 3 (e.g., on the color filter substrate side), where the markers 4 are formed simultaneously with the formation of the black matrix (not shown) during the process of forming the color filter substrate (not shown).

In addition, a sheet-shaped transparent member, such as a polarizer plate, is placed on or over the front surface of the display panel 3. Therefore, when the markers 4 are formed on the front surface of the panel 3, the sheet-shaped transparent member is placed in such a way as to cover the markers 4. Unlike this, when the markers 4 are formed on the back of the panel 3, the sheet-shaped transparent member is placed directly on the front surface of the panel 3.

As shown in FIG. 6C, the display device 1 according to the first embodiment comprises the display panel 3, on which the alignment markers 4 are formed, and the sheet-shaped lenticular lens (i.e., the lenticular lens sheet) 2 attached to a desired position on the panel 3.

Here, the display panel 3 comprises the structure of a known LCD panel; in other words, the panel 3 comprises a main substrate (or a Thin-Film-Transistor substrate), an opposite substrate (or a color filter substrate) joined and unified to the main substrate at a predetermined gap, and a liquid crystal layer formed between these two substrates. Since the structure of the LCD panel is well known, further explanation is omitted here.

Figure 9:
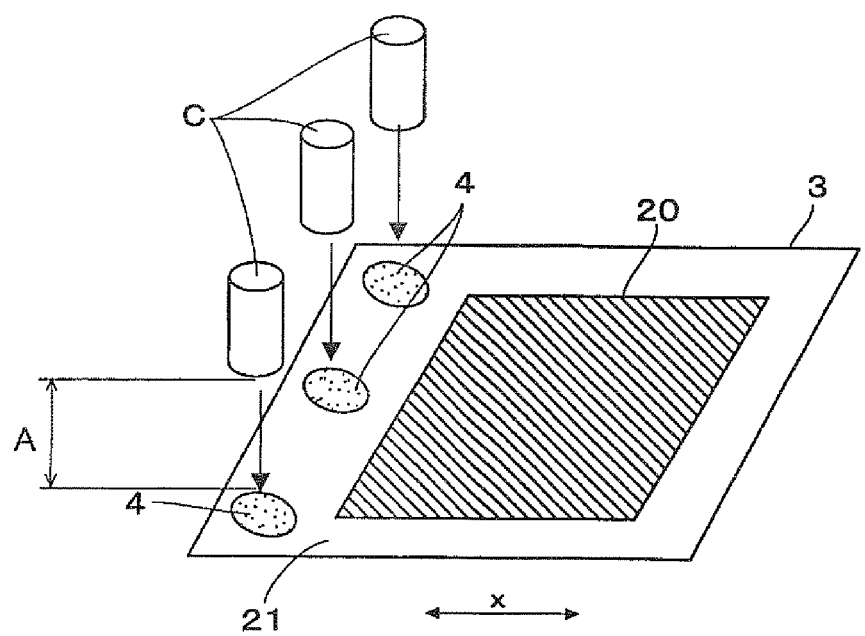
FIG. 9 is a schematic perspective view showing the placement positions of the alignment markers provided on the display panel and those of the cameras provided over these markers in the method of fabricating a display device according to the first embodiment of the present invention.

The three markers 4, which have the same structure, are formed on the front surface (i.e., the main surface on the side of the opposite substrate) of the display panel 3 at the predetermined positions. As shown in FIG. 9, all of these markers 4 are located outside the display region 20 of the display panel 3, in other words, these markers 4 are located in the non-display region 21. Each of the markers 4 has such a plan shape (pattern) as shown in FIG. 7D, which will be explained in more detail later.

The lenticular lens 2, which is rectangular sheet-shaped in its entirety, is attached to the front surface (i.e., the main surface on the side of the opposite substrate) of the display panel 3. The lenticular lens 2 is constituted by a plurality of convex, semicylindrical lens elements 6 connected in series along the short-side direction (i.e., the optical dividing direction) x of the elements 6. Each of the semicylindrical lens elements 6 is an optical element that divides incident light into two light beams (in other words, separates images) to emit respectively these two beams toward the left eye (i.e., the first viewpoint) and right eye (i.e., the second viewpoint). This means that each semicylindrical lens element 6 functions as an "optical dividing element" or an "optical image separation element". Parallax of a man or viewer is reproduced by the semicylindrical lens elements 6 and therefore, different images can be displayed for the left and right eyes.

When the lenticular lens 2 is attached to the front surface of the display panel 3, the lens 2 is positioned on the said front surface in such a way that one of the semicylindrical lens elements 6 of the lens 2 is superposed on the unit pixels arranged in a matrix array in the display region 20 of the panel 3. Since each of the unit pixels is formed by a left-eye sub pixel and a right-eye sub pixel, one of the lens elements 6 is superposed on the left- and right-eye sub pixels that constitute a corresponding one of the unit pixels. Since the lenticular lens 2 is slightly larger than the display region 20, the lens elements 6 can be superposed on the markers 4 arranged in the non-display region 21.

The display device 1 according to the first embodiment is configured such that the synthesized images 5a, 5b, 5c, 5d, and 5e shown in FIGS. 6A to 6E are alternately recognized according to their positional relationship when an image of each marker 4 on the display panel 3 is picked up with the camera C by way of the lenticular lens 2 at the predetermined visual recognition distance A, as shown in FIG. 9. By utilizing the synthesized images 5a, 5b, 5c, 5d, and 5e, the lenticular lens 2 can be aligned in position to the display panel 3 and attached onto the panel 3 at the predetermined position.

The visual recognition distance A may be determined in advance in such a way that the synthesized images 5a, 5b, 5c, 5d, and 5e are recognized as desired. The synthesized images 5a, 5b, 5c, 5d, and 5e are not limited to the patterns shown in FIGS. 6A to 6D; they may have any other patterns if they can be discriminated visually.

In the case where the lenticular lens 2 is located at the desired position (i.e., the optimum position) on the display panel 3, the synthesized image 5c of the marker 4 shown in FIG. 6C is generated. This image 5c has a rectangular frame-shaped pattern.

If the display panel 3 is slightly deviated leftward with respect to the lenticular lens 2, the synthesized image 5b of the marker 4 shown in FIG. 6B is generated. This image 5b has a pattern comprising two thin straight lines extending vertically and three straight broken lines extending laterally (the central one of which is relatively thick and the upper and lower ones of which are relatively thin).

If the display panel 3 is deviated leftward furthermore with respect to the lenticular lens 2, the synthesized image 5a of the marker 4 shown in FIG. 6A is generated. This image 5a has a pattern comprising a single thick straight line extending laterally.

Contrarily, if the display panel 3 is slightly deviated rightward with respect to the lenticular lens 2, the synthesized image 5d of the marker 4 shown in FIG. 6D is generated. This image 5d has a pattern comprising three straight lines extending vertically (the central one of which is relatively thick and the left and right ones of which are relatively thin) and three straight broken lines extending laterally.

If the display panel 3 is deviated rightward furthermore with respect to the lenticular lens 2, the synthesized image 5e of the marker 4 shown in FIG. 6E is generated. This image 5e has a cross-shaped pattern comprising a relatively thicker straight line extending vertically and a relatively thinner straight line extending laterally.

Because the synthesized images 5a, 5b, 5c, 5d, and 5e shown in FIGS. 6A to 6E are clearly different from each other, they can be discriminated easily. Therefore, if an image of each of the markers 4 formed on the display panel 3 is visually recognized by way of the lenticular lens 2 at the predetermined visual recognition distance A, the clearly different synthesized image 5a, 5b, 5c, 5d, or 5e is generated in accordance with the direction and quantity of positional deviation of the display panel 3 with respect to the lenticular lens 2. Accordingly, the direction and quantity of the aforementioned positional deviation can be perceived by intuition according to which one of the synthesized images 5a, 5b, 5c, 5d, and 5e is recognized.

Each of the markers 4 has the pattern shown in FIG. 7D, which is constituted by a marker element 10c for the first viewpoint, a marker element 11c for the second viewpoint, a marker element 12c for the third viewpoint. These marker elements 10c, 11c, and 12c are respectively formed by a marker element 10a for the first viewpoint, a marker element 11a for the second viewpoint, and a marker element 12a for the third viewpoint, shown in FIG. 7A, which are different in plan shape.

The marker element 10a for the first viewpoint is formed by a single straight line with a predetermined thickness that extends along the image separation direction x (i.e., the lateral direction in FIG. 7A), where the single straight line is placed in the middle of a square region (which is not illustrated in FIG. 7A and which will be termed the "initial region" later). The length of this line is equal to the width of the initial region.

The marker element 11a for the second viewpoint is formed by two straight lines (which are respectively placed along the two opposite sides of the same initial region as the marker element 10a for the first viewpoint) that extends along the image separation direction x (i.e., the lateral direction in FIG. 7A), and two straight lines (which are respectively placed along the other two opposite sides of the same initial region) that extends along a direction perpendicular to the image separation direction x (i.e., the vertical direction in FIG. 7A, in other words, the long-side direction of the lenticular lens 2 or the extension direction of the semicylindrical lens elements 6), thereby forming a frame-shaped pattern (like a picture frame) as a whole. The widths of these two vertical lines are equal to each other and the lengths thereof are equal to the width of the said initial region. The widths of these two lateral lines are equal to each other and the lengths thereof are equal to the subtraction result of double the width of each vertical line from the width of the said initial region.

The marker element 12a for the third viewpoint is formed by a straight line that extends along the image separation direction x and a straight line that extends along the direction perpendicular to the image separation direction x, thereby forming a cross-shaped pattern as a whole. These two lines are placed in the middle of the initial region. The width and the length of the lateral line are equal to the width and the length of the marker element 10a for the first viewpoint, respectively. The width and the length of the vertical line are equal to the width and the length of the vertical line of the marker element 11a for the second viewpoint, respectively. The intersection of the two lines forming the marker element 12a is located at the center of the said initial region.

Next, a formation method of the marker 4 of the first embodiment will be explained below.

Figure 7A:
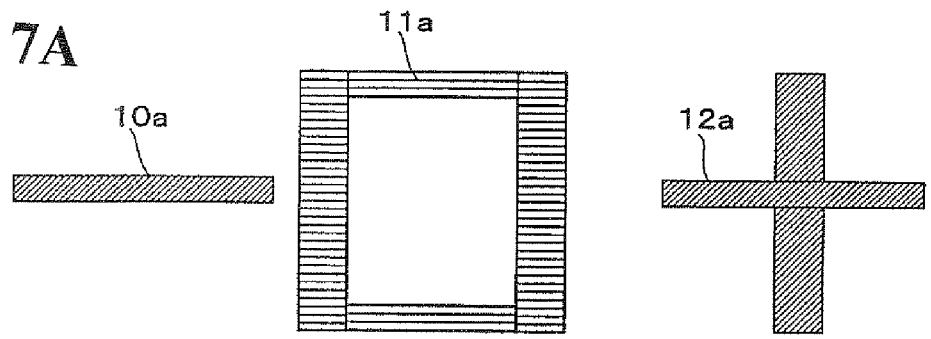
FIGS. 7A to 7D are explanatory illustrations showing a series of formation steps of the alignment marker according to the first embodiment of the present invention, respectively.

First, the above-described marker elements 10a, 11a, and 12a for the first, second, and third viewpoints shown in FIG. 7A are respectively formed in the square initial regions with the same size.

Figure 7B:
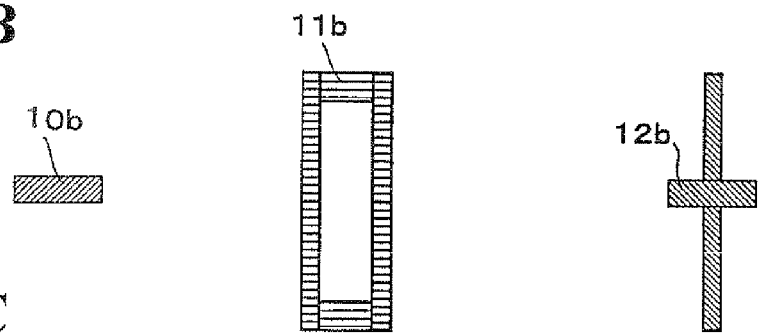

Subsequently, as shown in FIG. 7B, these marker elements 10a, 11a, and 12a for the first, second, and third viewpoints are respectively scaled down (1/the marker element number per lens element) along the image separation direction x of the lenticular lens 2 to be attached to the display panel 3. In the first embodiment described here, the three marker elements 10a, 11, and 12a are assigned to each lens element 6 of the lenticular lens 2 and therefore, the marker element number per lens element is three. This means that the marker elements 10a, 11a, and 12a are scaled down (⅓), respectively. As a result, as shown in FIG. 7B, the initial marker elements 10a, 11a, and 12a are respectively turned to (⅓) scaled-down marker elements 10b, 11b, and 12b that are scaled down (⅓) along the image separation direction x.

In addition, since the initial marker elements 10a, 11a, and 12a are not scaled down along the direction perpendicular to the image separation direction x, the lengths of the scaled-down marker elements 10b, 11b, and 12b along the said direction are the same as those of the initial marker elements 10a, 11a, and 12a, respectively.

Figure 7C:
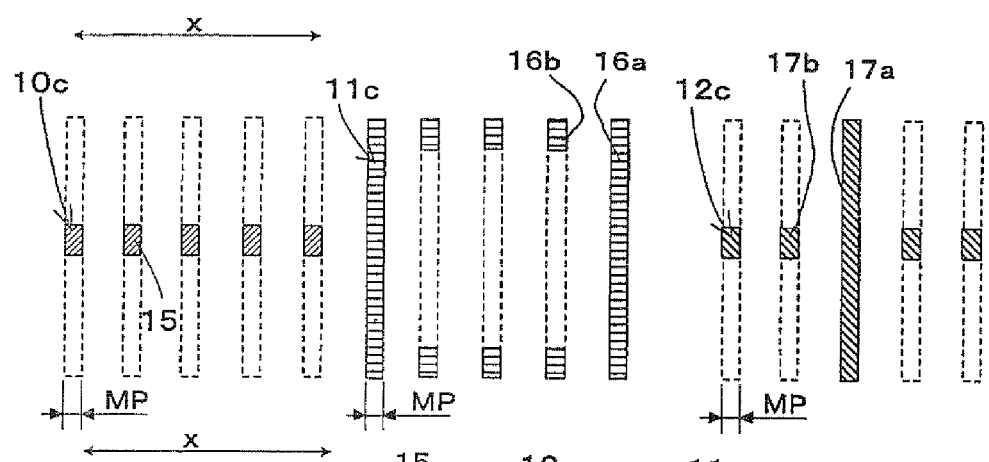
Figure 7D:
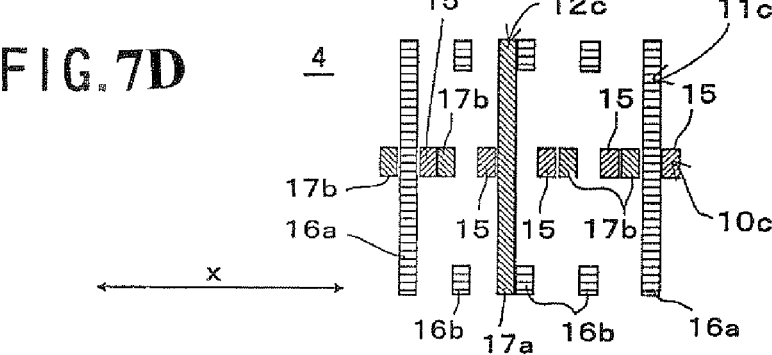
Figure 8:
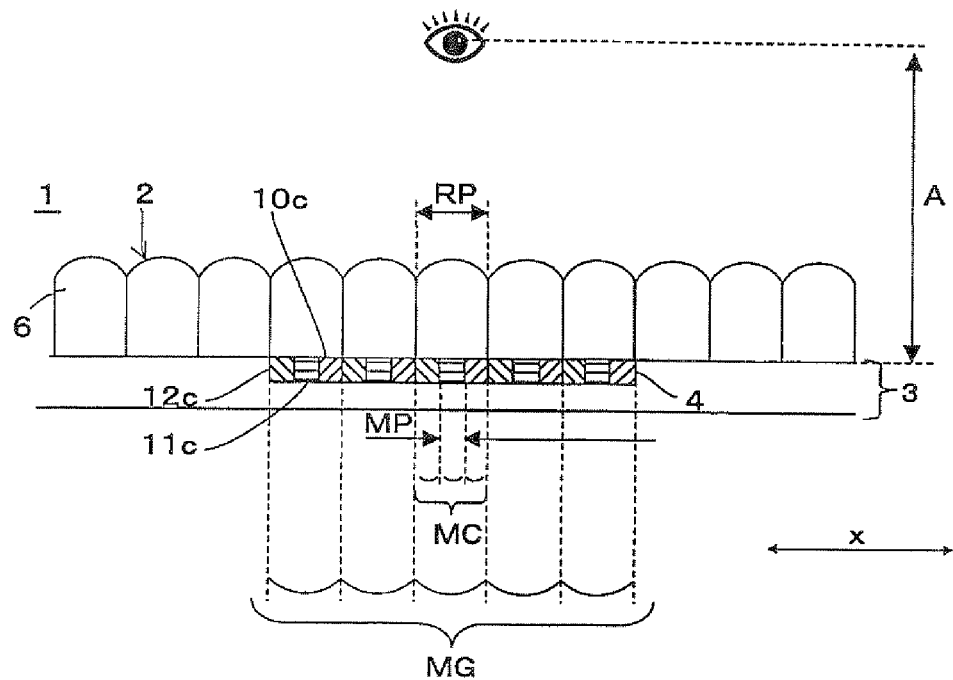
FIG. 8 is an explanatory side view showing the relationship among the lens element pitch, the marker element pitch, the marker element piece repetition cycle, the marker element piece number, and the visual recognition distance in the method of fabricating a display device according to the first embodiment of the present invention.

Following this, as shown in FIG. 7C, the scaled-down marker elements 10b, 11b, and 12b are respectively divided into five equal parts in such a way as to have widths equal to a predetermined marker element pitch MP, thereby forming divided marker elements 10c, 11, and 12c. The divided marker elements 10c, 11, and 12c have strip-like shapes. Here, the marker element pitch MP is set to be equal to the vertically extending straight line or stripe of the scaled-down marker element 11b for the second viewpoint. (This is equal to the width of the vertically extending straight line or stripe of the scaled-down marker element 12b for the third viewpoint also.) The reason why the scaled-down marker elements 10b, 11b, and 12b are respectively divided into five equal parts at this stage is that one marker 4 is formed for (or assigned to) the five lens elements 6 of the lenticular lens 2, as shown in FIG. 8.

As shown in FIG. 7C, the divided marker element 10c for the first viewpoint is formed by five marker element pieces 15. The divided marker element 11c for the second viewpoint is formed by two relatively longer marker element pieces 16a located at each end, and three relatively shorter marker element pieces 16b arranged between the pieces 16a. The divided marker element 12c for the third viewpoint is formed by a single relatively longer marker element piece 17a located at the center, and four relatively shorter marker element pieces 17b arranged symmetrically at each side of the piece 17a.

Finally, the marker element pieces 15 of the marker element 10c, the marker element pieces 16a and 16b of the marker element 11c, and the marker element pieces 17a and 17b of the marker element 12c are arranged adjacently at the marker element pitch MP in the predetermined order of the pieces 12c, 11c, and 10c, thereby forming the pattern as the marker 4. As shown in FIG. 7D, the marker 4 comprises the fifteen marker element pieces 15, 16a, 16b, 17a, and 17b aligned regularly. These fifteen marker element pieces 15, 16a, 16b, 17a, and 17b are divided into groups. A set of the three aligned marker element pieces constitutes each of the groups, which corresponds to the marker element piece repetition cycle MC.

Looking at FIG. 7D from its left end toward its right end successively, the marker 4 is constituted by the first marker element piece group (17b, 16a, 15), the second marker element piece group (17b, 16b, 15), the third marker element piece group (17a, 16b, 15), the fourth marker element piece group (17b, 16b, 15), and the fifth marker element piece group (17b, 16a, 15). Each of the first to fifth marker element piece groups corresponds to the marker element piece repetition cycle MC.

Concretely speaking, first, the marker element piece 17b positioned at the left end of the marker element 12c for the third viewpoint is placed at an arbitrary position. The marker element piece 16a positioned at the left end of the marker element 11c for the second viewpoint is placed at the right side of the said marker element piece 17b to be adjacent thereto. The marker element piece 15 positioned at the left end of the marker element 10c for the first viewpoint is placed at the right side of the said marker element piece 16a to be adjacent thereto. In this way, the first marker element piece group (17b, 16a, 15) is formed.

Second, adjacent to the marker element piece 15 placed at the right end of the first marker element piece group, the marker element piece 17b positioned at the second from the left end of the marker element 12c is placed at the right side of the aforementioned marker element piece 15. Adjacent to the marker element piece 17b thus placed, the marker element piece 16b positioned at the second from the left end of the marker element 11c is placed at the right side of the said marker element piece 17b. Adjacent to the marker element piece 16b thus placed, the marker element piece 15 positioned at the second from the left end of the marker element 10c is placed at the right side of the said marker element piece 16b. In this way, the second marker element piece group (17b, 16b, 15) is formed.

Third, adjacent to the marker element piece 15 placed at the right end of the second marker element piece group, the marker element piece 17a positioned at the third (i.e., the center) from the left end of the marker element 12c is placed at the right side of the aforementioned marker element piece 15. Adjacent to the marker element piece 17a thus placed, the marker element piece 16b positioned at the third (i.e., the center) from the left end of the marker element 11c is placed at the right side of the said marker element piece 17a. Adjacent to the marker element piece 16b thus placed, the marker element piece 15 positioned at the third (i.e., the center) from the left end of the marker element 10c is placed at the right side of the said marker element piece 16b. In this way, the third marker element piece group (17a, 16b, 15) is formed.

Fourth, adjacent to the marker element piece 15 placed at the right end of the third marker element piece group, the marker element piece 17b positioned at the fourth from the left end of the marker element 12c is placed at the right side of the aforementioned marker element piece 15. Adjacent to the marker element piece 17b thus placed, the marker element piece 16b positioned at the fourth from the left end of the marker element 11c is placed at the right side of the said marker element piece 17b. Adjacent to the marker element piece 16b thus placed, the marker element piece 15 positioned at the fourth from the left end of the marker element 10c is placed at the right side of the said marker element piece 16b. In this way, the fourth marker element piece group (17b, 16b, 15) is formed.

Finally, adjacent to the marker element piece 15 placed at the right end of the fourth marker element piece group, the marker element piece 17b positioned at the right end of the marker element 12c is placed at the right side of the aforementioned marker element piece 15. Adjacent to the marker element piece 17b thus placed, the marker element piece 16a positioned at the right end of the marker element 11c is placed at the right side of the said marker element piece 17b. Adjacent to the marker element piece 16a thus placed, the marker element piece 15 positioned at the right end of the marker element 10c is placed at the right side of the said marker element piece 16a In this way, the fifth marker element piece group (17b, 16a, 15) is formed.

As explained above, by arranging the respective marker element pieces in the aforementioned manner, the marker 4 with the pattern shown in FIG. 7D is obtained.

The above-described arrangement method of the marker element pieces for the marker 4 may be reworded as follows:

Specifically, as shown in FIG. 7C, the five marker element pieces 15 of the marker element 10c for the first viewpoint are arranged along one direction at equal intervals, where the interval is twice (=3−1) as much as the marker element pitch MP. Next, the five marker element pieces 16a and 16b of the marker element 11c for the second viewpoint are arranged along the same direction at the equal intervals of twice as much as the marker element pitch MP in such a way as to be shifted toward one of the two sides along their arrangement direction (here, rightward) by one marker element pitch MP with respect to the marker element pieces 15. Finally, the five marker element pieces 17a and 17b of the marker element 12c for the third viewpoint are arranged along the same direction at the equal intervals of twice as much as the marker element pitch MP in such a way as to be shifted again toward the same side along their arrangement direction (here, rightward) by one marker element pitch MP with respect to the marker element pieces 16a and 16b. In this way, the marker element pieces 17a and 17b, 16a and 16b, and 15 of the marker elements 12c, 11c, and 10c are alternately arranged one by one along the same direction, resulting in the marker 4 having the pattern of FIG. 7D.

Since the marker 4 includes the five marker element piece repetition cycles (which may be termed the "repetition cycles") MC and the fifteen marker element pieces (in other words, the five marker element pitches MP) in total, the marker element piece number MG included in the marker 4 is fifteen. This means that the relationships of MC=3 MP and MG=5MC=15 MP are established.

The marker element piece repetition cycle MC is in accordance with the width of the semicylindrical lens element 6 of the lenticular lens 2. In other words, as shown in FIG. 8, the marker element piece repetition cycle MC is determined in such a way as to be equal to the width of the lens element 6, and one-third (⅓) of the repetition cycle MC is set as the marker element pitch MP. These relationships are illustrated in FIG. 8.

The value of the repetition cycle MC and the value of the marker element piece number MG may be arbitrarily determined, respectively. The value of the marker element pitch MP can be calculated using the following equation (1):

$$\text{MARKER ELEMENT PITCH} = \left( \frac{1}{\text{MARKER ELEMENT PIECE NUMBER} \times \text{REPETITION CYCLE}} \right) \times \tag{1}$$

$$\left[ \tan\left\{ \sin^{-1}\left( \frac{\sin\left( \tan^{-1}\frac{\text{MARKER ELEMENT PIECE NUMBER} \times \text{LENS ELEMENT PITCH}}{\text{VISUAL RECOGNITION DISTANCE}} \right)}{\text{REFRACTIVE INDEX OF LENS}} \right) \right\} \times \right.$$

$$\left. \left( \text{LENS THICKNESS} \times 2 \right) + \left( \text{MARKER ELEMENT PIECE NUMBER} \times \text{LENS ELEMENT PITCH} \right) \right]$$

As shown in FIG. 9, the marker 4 is formed in the non-display region (in other words, the picture frame region) 21 of the display panel 3 using a known photolithography or printing method in such a way as not to overlap with the display region 20. In the first embodiment explained here, the markers 4 are arranged in the non-display region 21 at equal intervals along the side parallel to the longitudinal direction of the lens elements 6 (which is perpendicular to the image separation direction x), where the markers 4 are respectively located at three positions, i.e., the upper, middle, and lower positions, of the aforementioned side. However, the markers 4 may be arranged at four or more positions. If the number of the markers 4 is increased in this way, the alignment accuracy between the display panel 3 and the lenticular lens 2 can be raised furthermore.

In the case where the number of the marker element piece number MG included in the marker 4 is increased, if the relative position between the display panel 3 and the lenticular lens 2 is deviated largely in their initial alignment operation, it is easier to know how the relative position deviates. However, if the number of the marker element piece number MG is too large, the non-display region 21 of the display panel 3 is enlarged and accordingly, the display device 1 itself is large-sized. Therefore, it is desirable that the number of the marker element piece number MG is suitably determined in accordance with the size of the display device 1.

Next, a method of fabricating the display device 1 with the aforementioned structure will be explained below. In this method, the display panel 3 shown in FIG. 9 is used, where the three markers 4 (each of which has the above-described structure) are arranged in the non-display region 21 along the side parallel to the longitudinal direction of the lens elements 6. The display panel 3 and the lenticular lens 2 are aligned in position to each other and thereafter, bonded together using a known aligning and bonding apparatus 22 shown in FIG. 10.

Figure 10:
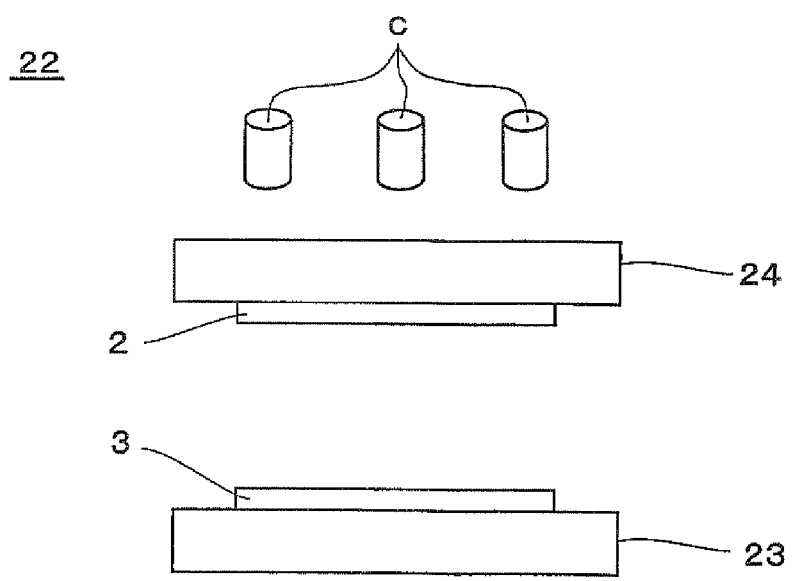
FIG. 10 is an explanatory side view showing the schematic structure of an aligning and bonding apparatus used in the method of fabricating a display device according to the first embodiment of the present invention.

As shown in FIG. 10, the aligning and bonding apparatus 22 comprises a lower stage 23 with an upper surface on which the display panel 3 can be held by vacuum absorption, an upper stage 24 with a lower surface on which the lenticular lens 2 is held by vacuum absorption, and three cameras C for picking up images of the markers 4 arranged on the display panel 3. The lower and upper stages 23 and 24 are located at the positions which are vertically superposed and are opposed to each other. The lower and upper stages 23 and 24 have optical transparency and therefore, the markers 4 on the panel 3 can be optically recognized by way of the stages 23 and/or 24.

First, an adhesive is coated on the predetermined adhering positions of the display panel 3 or the lenticular lens 2. Instead of the adhesive, a clingy sheet may be attached.

Next, the display panel 3 is held on the upper surface of the lower stage 23 of the aligning and bonding apparatus 22 by vacuum absorption, and the lenticular lens 2 is held on the lower surface of the upper stage 24 thereof by vacuum absorption. Thereafter, the upper stage 24 is lowered (or, the lower stage 23 is raised) to thereby bring the lenticular lens 2 close to the display panel 3. At this time, the cameras C of the apparatus 22 are disposed at respective positions apart from the corresponding markers 4 at the visual recognition distance A. Since the positional alignment is not yet completed at this stage, the lenticular lens 2 and the display panel 3 are not contacted and kept apart from each other at a predetermined minute distance.

Subsequently, to match the rotation directions of the lenticular lens 2 and the display panel 3 (in other words, the rotation direction of the lenticular lens 2 in a plane parallel to the display panel 3), the relative positions of the lens 2 and the panel 3 are adjusted in such a way that the images of the markers 4 located at the upper, middle, and lower positions of the panel 3, which are generated by the cameras C, accord with each other, thereby making positional alignment along the rotation directions of the lens 2 and the panel 3.

Here, for example, if the markers 4 are located at only the upper and lower positions of the panel 3, the same synthesized image is generated at these two positions even if the markers 4 are shifted in position by one or more repetition cycles of the marker 4, and as a result, there is a possibility that the positional deviation of the marker 4 along the rotation direction is unable to be found. To cope with this disadvantage, in the first embodiment described here, the markers 4 are provided at the upper, middle, and lower positions of the panel 3. It is needless to say that the markers 4 may be provided on the panel 3 at four or more positions. Since the range of the depth of focus wherein the markers 4 are clearly seen is wide, the focus adjustment of the cameras C is unnecessary even if the lens 2 and the adhesive (or the clingy sheet) has thickness dispersion. Therefore, no effect is applied to the tact time.

After the positional alignment of the lenticular lens 2 and the display panel 3 along the rotation direction is completed in the aforementioned manner, the upper stage 24 is translated and stopped at the predetermined superposing position and then, the positional alignment of the lens 2 and the panel 3 along the short-side direction of the lens element 6 (i.e., the image separation direction x) is carried out. At this time, the position of the upper stage 24 is adjusted in such a way that each of the synthesized images of the markers 4 arranged at the upper, middle, and lower positions of the panel 3, which are recognized by the respective cameras C, is the same as the synthesized image 5c shown in FIG. 6C.

If the display panel 3 is deviated in position leftward with respect to the lenticular lens 2 when the upper stage 24 is stopped, the synthesized image 5b shown in FIG. 6B or the synthesized image 5a shown in FIG. 6A is recognized visually in accordance with the quantity of the positional deviation. On the contrary, if the display panel 3 is deviated in position rightward with respect to the lens 2, the synthesized image 5d shown in FIG. 6D or the synthesized image 5e shown in FIG. 6E is recognized visually in accordance with the quantity of the positional deviation. For this reason, the direction and the distance to be corrected are immediately found and necessary positional correction can be performed promptly.

After the positional alignment of the lenticular lens 2 and the display panel 3 along the image separation direction x is completed in the aforementioned manner, the upper stage 24 is lowered, thereby contacting the lens 2 with the panel 3. Thus, the lens 2 is bonded to the panel 3 with the adhesive (or clinging sheet) coated previously. In this way, the display device 1 according to the first embodiment is fabricated.

With the display device 1 according to the first embodiment, as explained in detail, the three alignment markers 4 are formed on the display panel 3, where each of the markers 4 is formed by the combination of the marker element 10c for the first viewpoint, the marker element 11c for the second viewpoint, and the marker element 12c for the third viewpoint and is produced in the following way.

Specifically, first, the marker elements 10a, 11a, and 12a for the first, second, and third viewpoints are respectively prepared in the square initial regions with the same size (see FIG. 7A). Next, these marker elements 10a, 11a, and 12a are respectively scaled down (⅓) along the image separation direction x of the lenticular lens 2 to be attached to the display panel 3, resulting in the scaled-down marker elements 10b, 11b, and 12b (see FIG. 7B). Furthermore, the scaled-down marker elements 10b, 11b, and 12b thus formed are respectively divided into five equal parts in such a way as to have widths equal to the predetermined marker element pitch MP, thereby forming the divided marker elements 10c, 11, and 12c (see FIG. 7C). Finally, the marker element pieces 15 of the marker element 10c, the marker element pieces 16a and 16b of the marker element 11c, and the marker element pieces 17a and 17b of the marker element 12c are arranged adjacently at the marker element pitch MP in the predetermined order of the pieces 12c, 11c, and 10c, thereby forming the pattern as the marker 4. In this way, the marker 4 with the structure of FIG. 7D is produced.

Accordingly, when an image of each marker 4 formed on the display panel 3 is picked up with the camera C by way of the lenticular lens 2 at the predetermined visual recognition distance A, one of the synthesized images 5a, 5b, 5c, 5d, and 5e shown in FIGS. 6A to 6E is visually recognized. For this reason, the presence or absence of the positional deviation between the lens 2 and the panel 3 along the image separation direction x (in other words, whether the positions are aligned or not) can be discriminated easily.

In addition, in the case where the lenticular lens 2 and the display panel 3 are not aligned in position, different synthesized images are visually recognized in accordance with the direction and quantity of the positional deviation along the image separation direction x. In other words, the synthesized images thus recognized vary according to the said direction and quantity of the positional deviation. Therefore, the direction and quantity of the positional deviation between the lens 2 and the panel 3 can be known easily.

Accordingly, an existing lenticular lens as it is can be used without the formation of markers on the said lens, and the positional alignment operation between the lenticular lens 2 and the display panel 3 can be performed with a usual aligning and bonding apparatus.

Furthermore, as explained above, an existing lenticular lens and a usual bonding apparatus are usable, and whether the lenticular lens 2 and the display panel 3 are aligned in position or not is discriminated in the above-described manner. Therefore, the discrimination operation can be carried out speedily and the positional deviation can be corrected promptly. This makes it possible to lower the fabrication cost of the display device 1 comprising the lens 2 and the panel 3 and to improve the productivity thereof.

In addition, since the marker 4 is formed in the aforementioned manner, if the patterns of the marker elements 10a, 11a, and 12a for the first, second, and third viewpoints are respectively determined in advance and then, the scaling-down, dividing, and arrangement processes of the marker elements 10a, 11a, and 12a are automated, the marker 4 can be formed on the display panel 3 using the same process steps and the same material as those of the existing markers. Accordingly, the fabrication cost of the display panel 1 is scarcely increased due to the formation of the marker 4.

FIG. 20 shows the result of the inventor's experiment about the alignment accuracy between the display panel 3 and the lenticular lens 2 performed by the inventor, where the marker element number MG (which is equal to the number of the marker element pitches MP included in the marker element piece repetition cycle MC) corresponding to (or, included in) one lens element 6 (i.e., the marker element piece repetition cycle MC) used as a parameter (see FIG. 8). The numerical values in the ALIGNMENT ACCURACY column denote the average values of the experiment results obtained by testing five display panels 3 with respect to each value of the marker element piece repetition cycle MC, which were normalized by the lens element pitch RP of the lens element 6.

As seen from FIG. 20, it was confirmed that positional alignment accuracy is improved with the increasing value of the marker element piece repetition cycle MC corresponding to one lens element 6.

Second Embodiment

Figure 11:
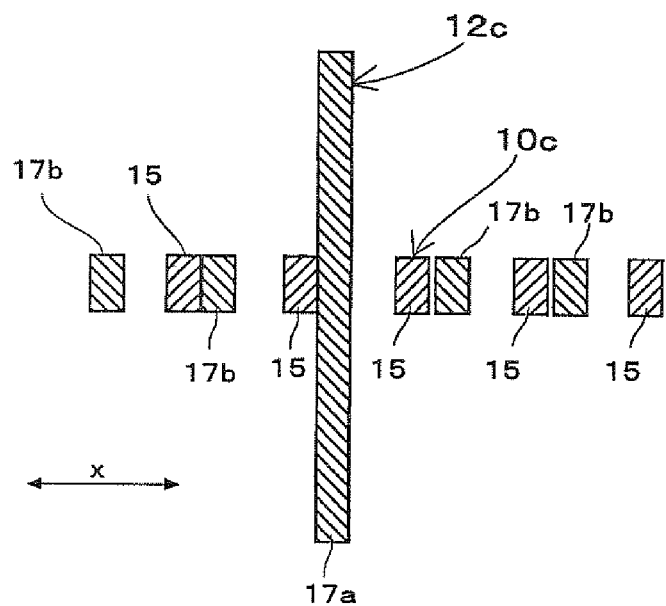
FIG. 11 is a plan view showing the structure of an alignment marker according to a second embodiment of the present invention.

FIG. 11 is a plan view showing an alignment marker 30 used in a display device 31 according to a second embodiment of the present invention, where the same reference numerals are attached to the same elements as those of the alignment marker 4 according to the above-described first embodiment of FIG. 7D.

FIGS. 12A to 12E show respectively the positional relationship between the lenticular lens 2 and the alignment marker 30, and synthesized images 32a, 32b, 32c, 32d, and 32e generated by picking up images of the alignment marker 30 on the display panel 3 with the cameras C by way of the lenticular lens 2 in a method of fabricating the display device 31 according to the second embodiment.

The marker 30 according to the second embodiment comprises the pattern shown in FIG. 11, which is constituted by the marker element 10c for the first viewpoint and the marker element 12c for the third viewpoint used in the aforementioned first embodiment. The marker element 11c for the second viewpoint used in the first embodiment is not included. The marker 30 corresponds to one obtained by omitting the marker element 11c from the marker 4 of the first embodiment and assigning spaces to the respective positions corresponding to the marker element pieces 16a and 16b of the marker element 11c.

The formation method of the marker 30 is as follows:

First, similar to the above-described first embodiment, the marker elements 10a and 12a for the first and third viewpoints are respectively formed. Then, these marker elements 10a and 12a are respectively scaled down (1/the marker element number per lens element) along the image separation direction x of the lenticular lens 2 to be attached to the display panel 3. In the second embodiment described here, the two marker elements 10a and 12a and the space having the same width as the marker element 11c for the second viewpoint are assigned to each semicylindrical lens element 6 of the lenticular lens 2 and therefore, the marker element number per lens element is three. This means that the marker elements 10a and 12a and the space are scaled down (⅓), respectively. As a result, the initial marker elements 10a and 12a are respectively turned to (⅓) scaled-down marker elements 10b and 12b that are scaled down (⅓) along the image separation direction x.

Following this, the scaled-down marker elements 10b and 12b are respectively divided into five equal parts in such a way as to have widths equal to the predetermined marker element pitch MP, thereby forming divided marker elements 10c and 12c. The divided marker element 10c is formed by the five marker element pieces 15. The divided marker element 12 is formed by the single relatively longer marker element piece 17a located at the center and the four relatively shorter marker element pieces 17b arranged symmetrically at each side of the piece 17a.

Finally, the marker element pieces 15 of the marker element 10c, the spaces having the same widths as the marker element pieces 16a and 16b of the marker element 11c, and the marker element pieces 17a and 17b of the marker element 12c are arranged adjacently at the marker element pitch MP in the predetermined order of the pieces 12c, the spaces, and the pieces 10c, thereby forming a pattern as the marker 30 shown in FIG. 11. As shown in FIG. 11, the marker 30 comprises the ten marker element pieces 15, 17a, and 17b and the five spaces aligned regularly. These ten marker element pieces 15, 17a, and 17b and the five spaces are divided into groups. A set of the two aligned marker element pieces and the space between them constitutes each of the groups, which corresponds to the marker element piece repetition cycle MC.

Looking at FIG. 11 from its left end toward its right end successively, the marker 30 is constituted by the first marker element piece group (17b, space, 15), the second marker element piece group (17b, space, 15), the third marker element piece group (17a, space, 15), the fourth marker element piece group (17b, space, 15), and the fifth marker element piece group (17b, space, 15). Each of the first to fifth marker element piece groups corresponds to the marker element piece repetition cycle MC.

Concretely speaking, first, the marker element piece 17b positioned at the left end of the marker element 12c for the third viewpoint is placed at the left end. The space having the same width as the marker element piece 16a positioned at the left end of the marker element 11c for the second viewpoint is placed at the right side of the said marker element, piece 17b to be adjacent thereto. The marker element piece 15 positioned at the left end of the marker element 10c for the first viewpoint is placed at the right side of the said space to be adjacent thereto. In this way, the first marker element piece group (17b, space, 15) is formed.

Second, adjacent to the marker element piece 15 placed at the right end of the first marker element piece group, the marker element piece 17b positioned at the second from the left end of the marker element 12c is placed at the right side of the aforementioned marker element piece 15. Adjacent to the marker element piece 17b thus placed, the space having the same width as the marker element piece 16a positioned at the second from the left end of the marker element 11c is placed at the right side of the said marker element piece 17b. Adjacent to the space thus placed, the marker element piece 15 positioned at the second from the left end of the marker element 10c is placed at the right side of the said space. In this way, the second marker element piece group (17b, space, 15) is formed.

Third, adjacent to the marker element piece 15 placed at the right end of the second marker element piece group, the marker element piece 17a positioned at the third (i.e., the center) from the left end of the marker element 12c is placed at the right side of the aforementioned marker element piece 15. Adjacent to the marker element piece 17a thus placed, the space having the same width as the marker element piece 16b positioned at the third (i.e., the center) from the left end of the marker element 11 is placed at the right side of the said marker element piece 17a. Adjacent to the space thus placed, the marker element piece 15 positioned at the third (i.e., the center) from the left end of the marker element 10c is placed at the right side of the said space. In this way, the third marker element piece group (17a, space, 15) is formed.

Fourth, adjacent to the marker element piece 15 placed at the right end of the third marker element piece group, the marker element piece 17b positioned at the fourth from the left end of the marker element 12c is placed at the right side of the aforementioned marker element piece 15. Adjacent to the marker element piece 17b thus placed, the space having the same width as the marker element piece 16b positioned at the fourth from the left end of the marker element 11c is placed at the right side of the said marker element piece 17b. Adjacent to the space thus placed, the marker element piece 15 positioned at the fourth from the left end of the marker element 10c is placed at the right side of the said space. In this way, the fourth marker element piece group (17b, space, 15) is formed.

Finally, adjacent to the marker element piece 15 placed at the right end of the fourth marker element piece group, the marker element piece 17b positioned at the right end of the marker element 12c is placed at the right side of the aforementioned marker element piece 15. Adjacent to the marker element piece 17b thus placed, the space having the same width as the marker element piece 16a positioned at the right end of the marker element 11c is placed at the right side of the said marker element piece 17b. Adjacent to the space thus placed, the marker element piece 15 positioned at the right end of the marker element 10c is placed at the right side of the said space. In this way, the fifth marker element piece group (17a, space, 15) is formed.

By the arrangement method explained here, the marker 30 with the pattern shown in FIG. 11 is obtained.

The above-described arrangement method of the marker element pieces may be reworded as follows:

Specifically, as shown in FIG. 11, the five marker element pieces 15 of the marker element 10c for the first viewpoint are arranged along one direction at equal intervals, where the interval is equal to the marker element pitch MP. Next, the five marker element pieces 17a and 17b of the marker element 12c for the third viewpoint are arranged along the same direction at intervals equal to the marker element pitch MP in such a way as to be shifted toward one of the two sides along their arrangement direction (here, rightward) by twice as much as the marker element pitch MP with respect to the marker element pieces 15. In this way, the marker element pieces 17a and 17b, and 15 of the marker elements 12c and 10c and the spaces are alternately arranged one by one along the same direction, resulting in the marker 30 having the pattern of FIG. 11.

Since the marker 30 includes the five repetition cycles MC and the fifteen marker element pieces or the spaces (i.e., the five marker element pitches MP) in total, the marker element piece number MG included in the marker 30 is fifteen. This means that the relationships of MC=3 MP and MG=5MC=15 MP are established.

The repetition cycle MC, which is equal to the total number of the marker element pieces and the spaces used in the marker 30, is in accordance with the width of the semicylindrical lens element 6 of the lenticular lens 2. (In the second embodiment described here, the marker elements 10a and 12a for the first and third viewpoints and the space corresponding to the marker element 11a for the second viewpoint are used and therefore, the total number of the marker elements is three.) In other words, similar to the aforementioned first embodiment, the marker element piece repetition cycle MC is determined in such a way as to be equal to the width of the lens element 6, and one-third (⅓) of the marker element piece repetition cycle MC is set as the marker element pitch MP.

Similar to the markers 4 according to the aforementioned first embodiment, the markers 30 according to the second embodiment are arranged in the non-display region (picture frame region) 21 at equal intervals along the side parallel to the longitudinal direction of the semicylindrical lens elements 6, where the markers 30 are respectively located at three positions, i.e., the upper, middle, and lower positions, of the aforementioned side (see FIG. 9). The marker 30 is formed in the non-display region 21 of the display panel 3 using a known photolithography or printing method in such a way as not to overlap with the display region 20.

In a method of fabricating the display device 31 according to the second embodiment, as shown in FIG. 9, when an image of each marker 30 formed on the display panel 3 is picked up with the camera C by way of the lenticular lens 2 at the predetermined visual recognition distance A, one of the synthesized images 32a, 32b, 32c, 32d, and 32e shown in FIGS. 12A to 12E is visually recognized. By utilizing the synthesized images 32a, 32b, 32c, 32d, and 32e, the lenticular lens 2 can be aligned in position to the display panel 3 and attached on the panel 3 at the desired position.

Figure 12:
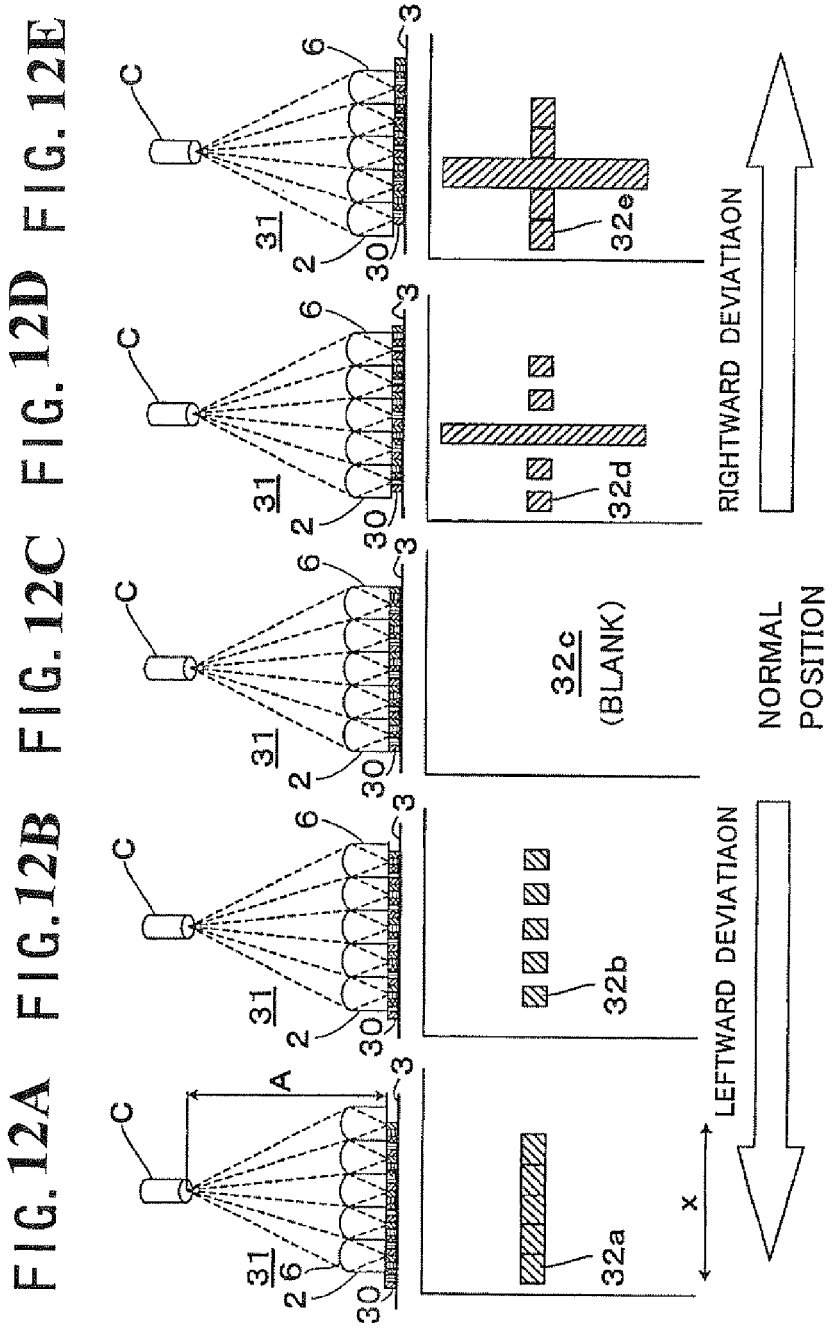
FIGS. 12A to 12E are explanatory illustrations showing a method of fabricating a display device according to the second embodiment of the present invention, respectively, wherein the positional relationship between a lenticular lens and an alignment marker, and a synthesized image generated by picking up an image of the alignment marker on a display panel by way of the lenticular lens are shown.

If the lenticular lens 2 is located at the desired position (i.e., the optimum position) on the display panel 3, the synthesized image 32a of blank shown in FIG. 12C is generated. In other words, no specific image is generated.

If the display panel 3 is slightly deviated in position leftward with respect to the lenticular lens 2, the synthesized image 32b of the marker 30 shown in FIG. 12B is generated. This image 32b has a pattern comprising a single straight broken line extending laterally.

If the display panel 3 is deviated in position leftward furthermore with respect to the lenticular lens 2, the synthesized image 32a of the marker 30 shown in FIG. 12A is generated. This image 32a has a pattern comprising a single straight line extending laterally.

If the display panel 3 is slightly deviated in position rightward with respect to the lenticular lens 2, the synthesized image 32d of the marker 30 shown in FIG. 12D is generated. This image 32d has a cross-shaped pattern comprising a straight line extending vertically and a straight broken line extending laterally.

If the display panel 3 is deviated in position rightward furthermore with respect to the lenticular lens 2, the synthesized image 32e of the marker 30 shown in FIG. 12E is generated. This image 32e has a cross-shaped pattern comprising a straight relatively thicker line extending vertically and a straight relatively thinner line extending laterally.

Because the synthesized images 32a, 32b, 32c, 32d, and 32e shown in FIGS. 12A to 12E are clearly different from each other, they can be discriminated easily. Therefore, in the aligning and bonding operation of the display panel 3 and the lenticular lens 2, if an image of each of the markers 30 formed on the panel 3 is visually recognized by way of the lens 2 at the predetermined visual recognition distance A, the direction and quantity of the positional deviation of the panel 3 with respect to the lens 2 can be perceived by intuition according to which one of the synthesized images 32a, 32b, 32c, 32d, and 32e is recognized.

As explained above, the display device 31 according to the second embodiment corresponds to one obtained by replacing the marker element 11c for the second viewpoint in the alignment marker 4 according to the aforementioned first embodiment with the spaces. The other structure of the device 31 is the same as the display device 1 according to the first embodiment. Therefore, the device 31 of the second embodiment has the same advantages as those of the device 1 of the first embodiment.

Third Embodiment

Figure 13:
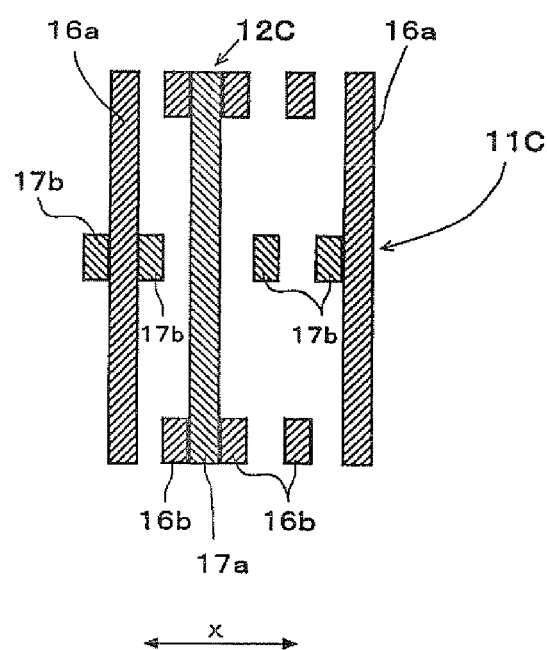
FIG. 13 is a plan view showing the structure of an alignment marker according to a third embodiment of the present invention.

FIG. 13 is a plan view showing an alignment marker 40 used in a display device 41 according to a third embodiment of the present invention, where the same reference numerals are attached to the same elements as those of the alignment marker 4 according to the above-described first embodiment of FIG. 7D.

FIGS. 14A to 14E show respectively the positional relationship between the lenticular lens 2 and the alignment marker 40, and synthesized images 42a, 42b, 42c, 42d, and 42e generated by picking up images of the alignment marker 40 on the display panel 3 with the cameras C by way of the lenticular lens 2 in a method of fabricating the display device 41 according to the third embodiment.

The marker 40 according to the third embodiment comprises the pattern shown in FIG. 13, which is constituted by the marker element 11c for the second viewpoint and the marker element 12c for the third viewpoint used in the aforementioned first embodiment. The marker element 10c for the first viewpoint used in the first embodiment is not included. The marker 40 corresponds to one obtained by omitting the marker element 10c from the marker 4 of the first embodiment and deleting the spaces corresponding to the marker element pieces 15 of the marker element 10c. In this way, the marker 40 comprises only the marker elements 11c and 12c and thus, the marker 40 is different from the markers 4 and 30 of the aforementioned first and second embodiments in this point.

As seen from the third embodiment, the alignment marker of the present invention may be formed by two marker elements.

The formation method of the marker 40 is as follows:

First, similar to the above-described first embodiment, the marker elements 11a and 12a for the second and third viewpoints are respectively formed. Then, these marker elements 11a and 12a are respectively scaled down (1/the marker element number per lens element) along the image separation direction x of the lenticular lens 2 to be attached to the display panel 3. In the third embodiment described here, the two marker elements 12a and 12a are assigned to each semicylindrical lens element 6 of the lenticular lens 2 and therefore, the marker element number per lens element is two. This means that the marker elements 11a and 12a are scaled down (½), respectively. As a result, the initial marker elements 11a and 12a are respectively turned to (½) scaled-down marker elements 11b and 12b that are scaled down (½) along the image separation direction x.

Following this, the scaled-down marker elements 11b and 12b are respectively divided into five equal parts' in such a way as to have widths equal to the predetermined marker element pitch MP, thereby forming divided marker elements 11c and 12c. The divided marker element 11c is formed by the two relatively longer marker element piece 16a located at each end and the three pairs of relatively shorter marker element pieces 16b arranged between the element pieces 16a. The divided marker element 12c is formed by the single relatively longer marker element piece 17a located at the center and the four relatively shorter marker element pieces 17b arranged symmetrically at each side of the piece 17a.

Finally, the marker element pieces 16a and 16b of the marker element 11c and the marker element pieces 17a and 17b of the marker element 12c are arranged adjacently at the marker element pitch MP in the predetermined order of the pieces 12c and 10c, thereby forming a pattern as the marker 40 shown in FIG. 13. The marker 40 comprises the ten marker element pieces 16a, 16b, 17a, and 17b aligned regularly. These ten marker element pieces 16a, 16b, 17a, and 17b are divided into groups. A set of the two adjoining marker element pieces constitutes each of the groups, which corresponds to the marker element piece repetition cycle MC.

Looking at FIG. 13 from its left end toward its right end successively, the marker 40 is constituted by the first marker element piece group (17b, 16a), the second marker element piece group (17b, 16b), the third marker element piece group (17a, 16b), the fourth marker element piece group (17b, 16b), and the fifth marker element piece group (17b, 16a). Each of the first to fifth marker element piece groups corresponds to the marker element piece repetition cycle MC.

The arrangement method of the marker element pieces of the marker 40 is as follows:

Specifically, as shown in FIG. 13, the five marker element pieces 17a and 17b of the marker element 12c for the third viewpoint are arranged along one direction at equal intervals, where the interval is equal to the marker element pitch MP. Next, the five marker element pieces 16a and 16b of the marker element 11c for the second viewpoint are arranged along the same direction at intervals equal to the marker element pitch MP in such a way as to be shifted toward one of the two sides along their arrangement direction (here, rightward) by the marker element pitch MP with respect to the marker element pieces 17a and 17b. In this way, the marker element pieces 17a, 17b, 16a, and 16b of the marker elements 12c and 11c are arranged one by one along the same direction, resulting in the marker 40 having the pattern of FIG. 13.

Since the marker 40 includes the five marker element piece repetition cycles MC and the ten marker element pieces in total, the marker element piece number MG included in the marker 40 is ten. This means that the relationships of MC=2 MP and MG=5MC=10 MP are established.

In the third embodiment described here, the marker elements 11a and 12a for the second and third viewpoints are used and therefore, the total number of the marker elements is two. Therefore, similar to the aforementioned first embodiment, the marker element piece repetition cycle MC is determined in such a way as to be equal to the width of the lens element 6, and half (½) of the marker element piece repetition cycle MC is set as the marker element pitch MP.

Similar to the markers 4 of the aforementioned first embodiment, the markers 40 of the third embodiment are arranged in the non-display region 21 with the same layout as the first embodiment. The marker 40 is formed using a known photolithography or printing method or the like.

In a method of fabricating the display device 41 according to the third embodiment, when an image of each marker 40 formed on the display panel 3 is picked up with the camera C by way of the lenticular lens 2 at the predetermined visual recognition distance A, one of the synthesized images 42*a*, 42*b*, 42*c*, 42*d*, and 42*e* shown in FIGS. 14A to 14E is visually recognized. By utilizing the synthesized images 42*a*, 42*b*, 42*c*, 42*d*, and 42*e*, the lenticular lens 2 can be aligned in position to the display panel 3 and attached on the panel 3 at the desired position.

If the lenticular lens 2 is located at the desired position (i.e., the optimum position) on the display panel 3, the synthesized image 42*c* shown in FIG. 14C is generated. This image 42*c* has a pattern comprising three straight lines extending vertically and three straight broken lines extending laterally.

If the display panel 3 is slightly deviated in position leftward with respect to the lenticular lens 2, the synthesized image 42*b* of the marker 40 shown in FIG. 14B is generated. This image 42*b* has a pattern comprising three straight lines extending vertically and three straight broken lines extending laterally, which is similar to the synthesized image 42*c*. However, this image 42*b* is different from the image 42*c* in that (i) the vertically extending line (which is located at the center) is smaller in width than that of the image 42*c*, (ii) the laterally extending broken line (which is located at the center) is smaller in width than that of the image 42*c* and the other two broken lines are larger in width than those of the image 42*c*, and (iii) the intervals of the discrete parts of the laterally extending broken lines are smaller than those of the image 42*c*.

If the display panel 3 is deviated in position leftward furthermore with respect to the lenticular lens 2, the synthesized image 42*a* of the marker 40 shown in FIG. 14A is generated. This image 42*a* has a pattern comprising two straight lines extending vertically and two straight lines extending laterally, where the vertical lines are thicker than those of the image 42*b*.

On the contrary, if the display panel 3 is slightly deviated in position rightward with respect to the lenticular lens 2, the synthesized image 42*d* of the marker 40 shown in FIG. 14D is generated. This image 42*d* has a pattern comprising three straight lines extending vertically and three straight broken lines extending laterally, which is similar to the synthesized image 42*c*. However, this image 42*d* is different from the image 42*c* in that (i) the vertically extending line (which is located at the center) is larger in width than that of the image 42*c* and the other two broken lines are smaller in width than those of the image 42*c*, (ii) the intervals of the discrete parts of the laterally extending broken lines are larger than those of the image 42*c*.

If the display panel 3 is deviated in position rightward furthermore with respect to the lenticular lens 2, the synthesized image 42*e* of the marker 40 shown in FIG. 14E is generated. This image 42*e* has a cross-shaped pattern comprising a relatively thicker straight line extending vertically and a relatively thinner straight line extending laterally. This image 42*e* is quite different from the image 42*d*.

Therefore, in the aligning and bonding operation of the display panel 3 and the lenticular lens 2, the direction and quantity of the positional deviation of the panel 3 with respect to the lens 2 can be perceived by intuition according to which one of the synthesized images 42*a*, 42*b*, 42*c*, 42*d*, and 42*e* is recognized.

As explained above, the display device 41 according to the third embodiment corresponds to one obtained by omitting the marker element 10*c* for the first viewpoint and arranging alternately the marker element pieces 16*a* and 16*b* of the marker element 11*c* for the second viewpoint and the marker element pieces 17*a* and 17*b* of the marker element 12*c* for the third viewpoint in the alignment marker 4 according to the aforementioned first embodiment. The other structure of the device 41 is the same as the display device 1 according to the first embodiment. Therefore, the device 41 of the third embodiment has the same advantages as those of the device 1 of the first embodiment.

In addition, with the third embodiment, the positional alignment accuracy is somewhat lower than the aforementioned first embodiment; however, the structure of the marker 40 can be simplified compared with that of the marker 4 of the first embodiment and therefore, there is an additional advantage that the productivity can be increased furthermore.

Fourth Embodiment

Figure 16:
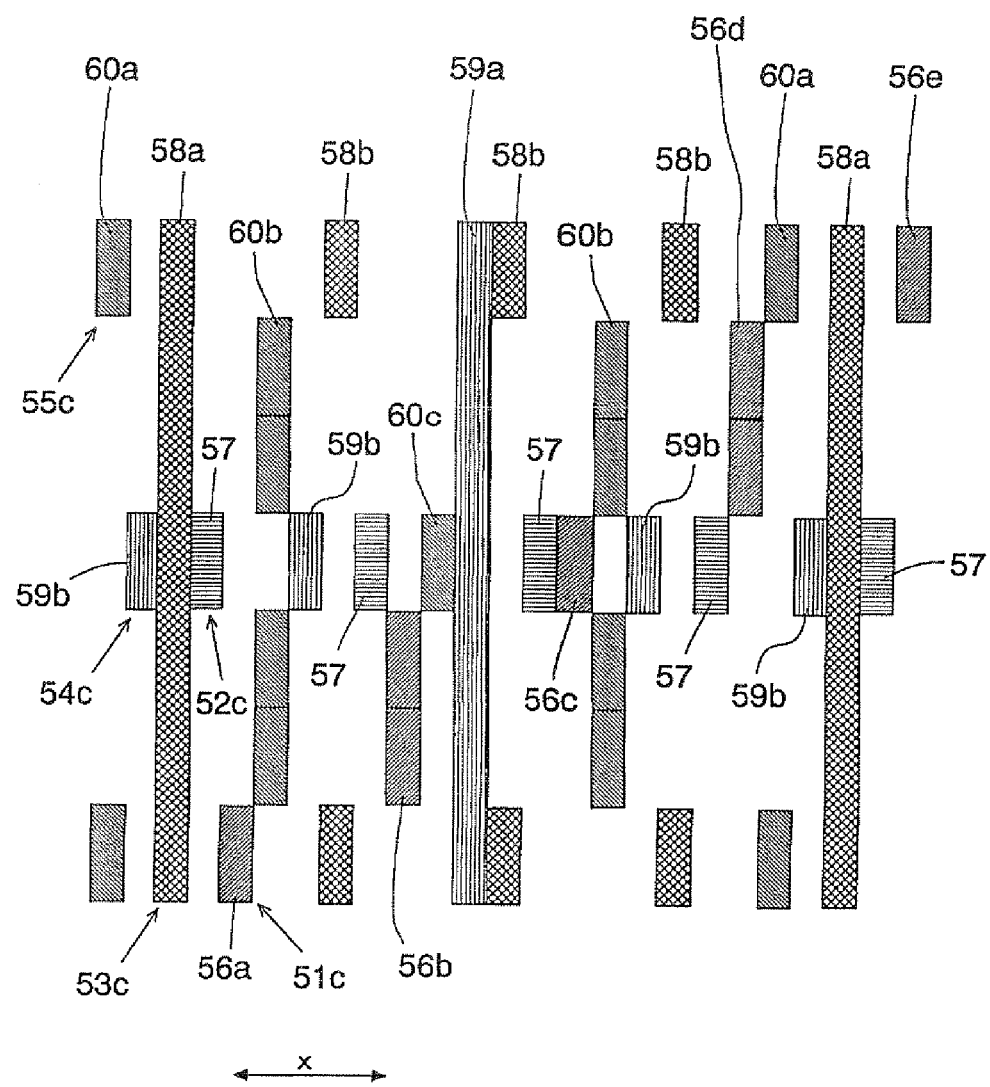
FIG. 16 is a plan view showing the structure of the alignment marker according to the fourth embodiment of the present invention.

FIG. 16 is a plan view showing an alignment marker 50 used in a display device 61 according to a fourth embodiment of the present invention.

FIGS. 17A to 17E show respectively the positional relationship between the lenticular lens 2 and the alignment marker 50, and synthesized images 62*a*, 62*b*, 62*c*, 62*d*, and 62*e* generated by picking up images of the alignment marker 50 on the display panel 3 with the cameras C by way of the lenticular lens 2 in a method of fabricating the display device 61 according to the fourth embodiment.

Figure 15A:
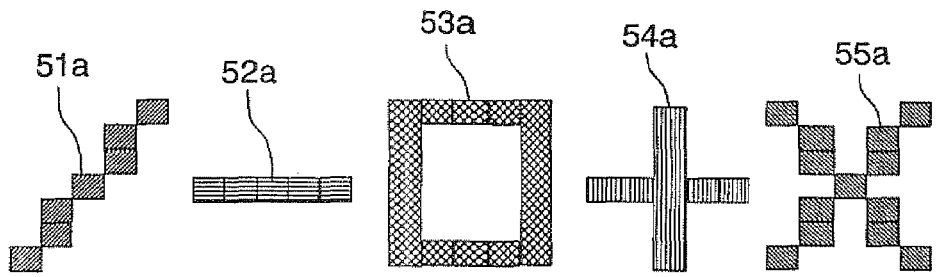
FIGS. 15A to 15C are explanatory illustrations showing a series of formation steps of an alignment marker according to a fourth embodiment of the present invention, respectively.
Figure 15B:
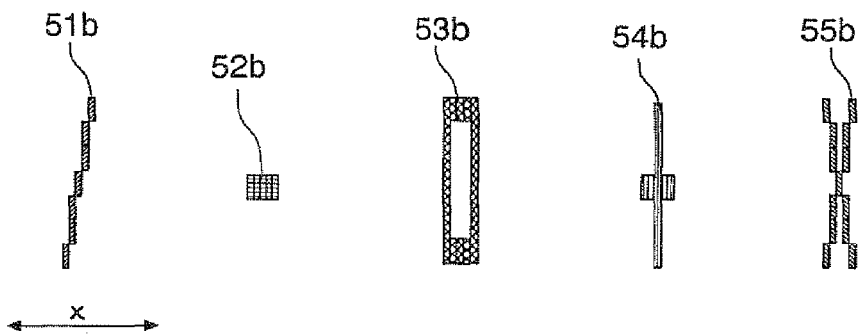
Figure 15C:
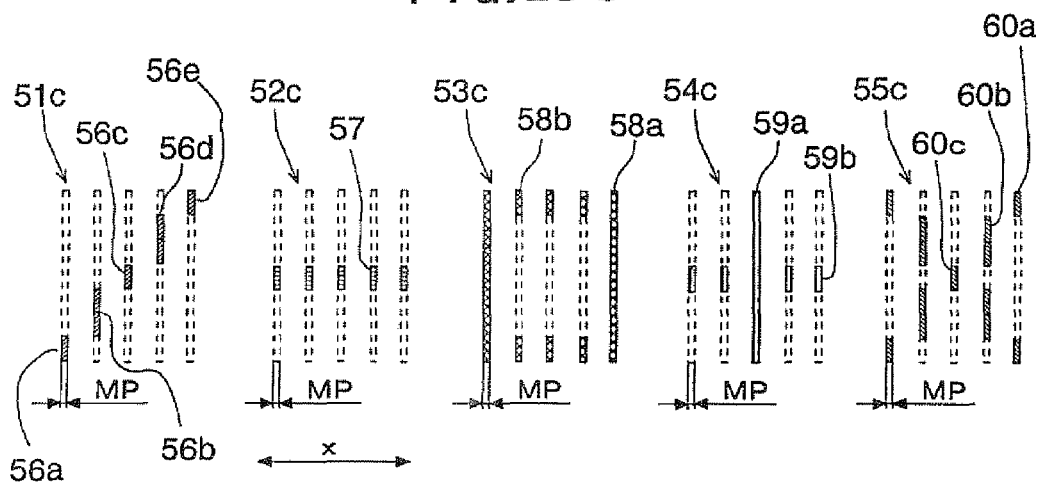

FIGS. 15A to 15C are plan views showing a series of formation steps of the alignment marker 50 according to the fourth embodiment of the present invention, respectively.

The marker 50 according to the fourth embodiment comprises the pattern shown in FIG. 16. This marker 50 is constituted by a marker element 51*c* for the first viewpoint, a marker element 52*c* for the second viewpoint, a marker element 53*c* for the third viewpoint, a marker element 54*c* for the fourth viewpoint, and a marker element 55*c* for the fifth viewpoint, which is different in plan shape or structure from the aforementioned first to third embodiments.

The marker element 51*a* for the first viewpoint is formed by a single stepped oblique line with a predetermined thickness which has a plan shape like stairs comprising small rectangular boxes and which is located at the center of the initial region. The oblique line extends from the lower left position of the initial region to the upper right position thereof. The length of the straight line along the image separation direction x and the length thereof along the direction perpendicular to the direction x (i.e., the vertical direction in FIG. 15A) are equal to the width and height of the initial region, respectively.

The marker element 52*a* for the second viewpoint is formed by a single straight line with a predetermined thickness extending along the image separation direction x, which is located at the center of the same initial region as the marker element 51*a*. The length of the straight line is equal to the width of the initial region.

The marker element 53*a* for the third viewpoint is formed by two straight lines (which are respectively placed along the two opposite sides of the same initial region as the marker element 51*a* for the first viewpoint) that extends along the image separation direction x (i.e., the lateral direction in FIG.

15A) and two straight lines (which are respectively placed along the other two opposite sides of the same initial region) that extends along a direction perpendicular to the image separation direction x (i.e., the vertical direction in FIG. 15A, in other words, the long-side direction of the lenticular lens 2 or the extension direction of the semicylindrical lens elements 6), thereby forming a frame-shaped pattern (like a picture frame) as a whole. The widths of these two vertical lines are equal to each other and the lengths thereof are equal to the width of the said initial region. The widths of these two lateral lines are equal to each other and the lengths thereof are equal to the subtraction result of double the width of each vertical line from the width of the said initial region.

The marker element 54a for the fourth viewpoint is formed by a lateral straight line that extends along the image separation direction x and a vertical straight line that extends along the direction perpendicular to the image separation direction x, thereby forming a cross-shaped pattern as a whole. The width and the length of the lateral line are equal to the width and the length of the marker element 52a for the second viewpoint, respectively. The width and the length of the vertical line are equal to the width and the length of the vertical line of the marker element 53a for the third viewpoint, respectively. The intersection of the two lines forming the marker element 54a is located at the center of the said initial region.

The marker element 55a for the fifth viewpoint is formed by a stepped oblique line with a predetermined thickness which has a plan shape like stairs small rectangular boxes and which extends from the lower left position of the initial region to the upper right position thereof, and another stepped oblique line with a predetermined thickness which has a plan shape like stairs and which extends from the upper left position of the initial region to the lower right position thereof. These two oblique lines are located at the center of the initial region. The lengths of these lines along the image separation direction x and the lengths thereof along the direction perpendicular to the direction x are equal to the width and height of the initial region, respectively.

As seen from the fifth embodiment described here, the marker of the present invention may be formed by five marker elements.

Next, a formation method of the marker 50 will be explained below.

First, the above-described marker elements 51a, 52a, 53a, 54a, and 55a for the first, second, third, fourth, and fifth viewpoints are respectively formed in the square initial regions with the same size.

Subsequently, as shown in FIG. 15B, these marker elements 51a, 52a, 53a, 54a, and 55a are respectively scaled down (1/the marker element number per lens element) along the image separation direction x of the lenticular lens 2 to be attached to the display panel 3. In the fourth embodiment described here, the five marker elements 51a, 52a, 53a, 54a, and 55a are assigned to each semicylindrical lens element 6 of the lenticular lens 2 and therefore, the marker element number per lens element is five. This means that the marker elements 51a, 52a, 53a, 54a, and 55a are scaled down (⅕), respectively. As a result, as shown in FIG. 15B, the initial marker elements 51a, 52a, 53a, 54a, and 55a are respectively turned to (⅕) scaled-down marker elements 51b, 52b, 53b, 54b, and 55b that are scaled down (⅕) along the image separation direction x.

In addition, since the initial marker elements 51a, 52a, 53a, 54a, and 55a are not scaled down along the direction perpendicular to the image separation direction x, the lengths of the scaled-down marker elements 51b, 52b, 53b, 54b, and 55b along the said direction are the same as those of the initial marker elements 51a, 52a, 53a, 54a, and 55a, respectively.

Following this, as shown in FIG. 15C, the scaled-down marker elements 51b, 52b, 53b, 54b, and 55b are respectively divided into five equal parts in such a way as to have widths equal to the predetermined marker element pitch MP, thereby forming divided marker elements 51c, 52c, 53c, 54c, and 55c. The divided marker elements 51c, 52c, 53c, 54c, and 55c have strip-like shapes. The marker element pitch MP is equal to the vertically extending straight line or stripe of the scaled-down marker element 53b for the third viewpoint. (This is equal to the width of the vertically extending straight line or stripe of the scaled-down marker element 54b for the fourth viewpoint.) The reason why the scaled-down marker elements 51b, 52b, 53b, 54b, and 55b are respectively divided into five equal parts at this stage is that one marker 50 is formed for (or assigned to) five semicylindrical lens elements 6.

As shown in FIG. 15C, the divided marker element 51c for the first viewpoint is formed by five marker element pieces 56a, 56b, 56c, 56d, and 56e which are successively shifted in position along the direction perpendicular to the image separation direction x. The divided marker element 52c for the second viewpoint is formed by five marker element pieces 57 which are arranged at the same positions along the direction perpendicular to the image separation direction x. The divided marker element 53c for the third viewpoint is formed by two marker element pieces 58a which are located at each end and three pairs of short marker element pieces 58b which are arranged between them. The divided marker element 54c for the fourth viewpoint is formed by a relatively longer marker element piece 59a which is located at the center and four relatively shorter marker element pieces 59b which are located symmetrically with respect to the element piece 59a. The divided marker element 55c for the fifth viewpoint is formed by two pairs of marker element pieces 60a which are located at each end, a marker element piece 60c located at the center, and two pairs of marker element pieces 60b which are respectively located between the element pieces 60a and 60c.

Finally, the marker element pieces 56a to 56e of the marker element 51c, the marker element pieces 57 of the marker element 52c, the marker element pieces 58a and 58b of the marker element 53c, the marker element pieces 59a to 59e of the marker element 54c, and the marker element pieces 60a, 60b, and 60c of the marker element 55c are arranged adjacently at the marker element pitch MP in the predetermined order of the pieces 55c, 54c, 53c, 52c, and 51c, thereby forming a pattern as the marker 50, as shown in FIG. 16. The marker 50 comprises the twenty five marker element pieces 56a to 56e, 57, 58a and 58b, 59a to 59e, and 60a, 60b, and 60c aligned regularly.

These twenty five marker element pieces 56a to 56e, 57, 58a and 58b, 59a to 59e, and 60a, 60b, and 60c are divided into groups. A set of the five aligned marker element pieces constitutes each of the groups, which corresponds to the marker element piece repetition cycle MC.

Looking at FIG. 16 from its left end toward its right end successively, the marker 50 is constituted by the first marker element piece group (60a, 59b, 58a, 57, 56a), the second marker element piece group (60b, 59b, 58b, 57, 56b), the third marker element piece group (60c, 59a, 58b, 57, 56c), the fourth marker element piece group (60b, 59b, 58b, 57, 56d), and the fifth marker element piece group (60a, 59b, 58a, 57, 56e). Each of the first to fifth marker element piece groups corresponds to the marker element piece repetition cycle MC.

Concretely speaking, first, the marker element piece 60a positioned at the left end of the marker element 55c for the fifth viewpoint is placed at an arbitrary position. The marker element piece 59b positioned at the left end of the marker element 54c for the fourth viewpoint is placed at the right side of the said marker element 55c to be adjacent thereto. The marker element piece 58a positioned at the left end of the marker element 53c for the third viewpoint is placed at the right side of the said marker element piece 59b to be adjacent thereto. The marker element piece 57 positioned at the left end of the marker element 52c for the second viewpoint is placed at the right side of the said marker element piece 58a to be adjacent thereto. The marker element piece 56a positioned at the left end of the marker element 51c for the first viewpoint is placed at the right side of the said marker element piece 57 to be adjacent thereto. In this way, the first marker element piece group (60a, 59b, 58a, 57, 56a) is formed.

Second, adjacent to the marker element piece 56a placed at the right end of the first marker element piece group, the marker element piece 60b positioned at the second from the left end of the marker element 55c is placed at the right side of the aforementioned marker element piece 56a. Adjacent to the marker element piece 60b thus placed, the marker element piece 59b positioned at the second from the left end of the marker element 54c is placed at the right side of the said marker element piece 60b. Adjacent to the marker element piece 59b thus placed, the marker element piece 58b positioned at the second from the left end of the marker element 53c is placed at the right side of the said marker element piece 59b. Adjacent to the marker element piece 58b thus placed, the marker element piece 57 positioned at the second from the left end of the marker element 52c is placed at the right side of the said marker element piece 58b. Adjacent to the marker element piece 57 thus placed, the marker element piece 56d positioned at the second from the left end of the marker element 51c is placed at the right side of the said marker element piece 57. In this way, the second marker element piece group (60b, 59b, 58b, 57, 56b) is formed.

Third, adjacent to the marker element piece 56b placed at the right end of the second marker element piece group, the marker element piece 60c positioned at the third (i.e., the center) from the left end of the marker element 55c is placed at the right side of the aforementioned marker element piece 56b. Adjacent to the marker element piece 60c thus placed, the marker element piece 59b positioned at the third (i.e., the center) from the left end of the marker element 54c is placed at the right side of the said marker element piece 60c. Adjacent to the marker element piece 59b thus placed, the marker element piece 58b positioned at the third (i.e., the center) from the left end of the marker element 53c is placed at the right side of the said marker element piece 59b. Adjacent to the marker element piece 58b thus placed, the marker element piece 57 positioned at the third (i.e., the center) from the left end of the marker element 52c is placed at the right side of the said marker element piece 58b. Adjacent to the marker element piece 57 thus placed, the marker element piece 56c positioned at the third (i.e., the center) from the left end of the marker element 51c is placed at the right side of the said marker element piece 57. In this way, the third marker element piece group (60c, 59a, 58b, 57, 56c) is formed.

Fourth, adjacent to the marker element piece 56c placed at the right end of the third marker element piece group, the marker element piece 60b positioned at the fourth from the left end of the marker element 55c is placed at the right side of the aforementioned marker element piece 56c. Adjacent to the marker element piece 60b thus placed, the marker element piece 59b positioned at the fourth from the left end of the marker element 54c is placed at the right side of the said marker element piece 60b. Adjacent to the marker element piece 59b thus placed, the marker element piece 58b positioned at the fourth from the left end of the marker element 53c is placed at the right side of the said marker element piece 59b. Adjacent to the marker element piece 58b thus placed, the marker element piece 57 positioned at the fourth from the left end of the marker element 52c is placed at the right side of the said marker element piece 58b. Adjacent to the marker element piece 57 thus placed, the marker element piece 56d positioned at the fourth from the left end of the marker element 51c is placed at the right side of the said marker element piece 57. In this way, the fourth marker element piece group (60b, 59b, 58b, 57, 56d) is formed.

Finally, adjacent to the marker element piece 56d placed at the right end of the fourth marker element piece group, the marker element piece 60a positioned at the fifth from the left end of the marker element 55c is placed at the right side of the aforementioned marker element piece 56d. Adjacent to the marker element piece 60a thus placed, the marker element piece 59b positioned at the fifth from the left end of the marker element 54c is placed at the right side of the said marker element piece 60a. Adjacent to the marker element piece 59b thus placed, the marker element piece 58a positioned at the fifth from the left end of the marker element 53c is placed at the right side of the said marker element piece 59b. Adjacent to the marker element piece 58a thus placed, the marker element piece 57 positioned at the fifth from the left end of the marker element 52c is placed at the right side of the said marker element piece 58a. Adjacent to the marker element piece 57 thus placed, the marker element piece 56e positioned at the fifth from the left end of the marker element 51c is placed at the right side of the said marker element piece 57. In this way, the fifth marker element piece group (60a, 59b, 58a, 57, 56e) is formed.

As explained above, by arranging the respective marker element pieces in the aforementioned manner, the marker 50 with the pattern shown in FIG. 16 is obtained.

The above-described arrangement method of the marker element pieces of the fourth embodiment may be reworded as follows:

Specifically, as shown in FIG. 15C, first, the five marker element pieces 56a, 56b, 56c, 56d, and 56e of the marker element 51c for the first viewpoint are arranged along one direction at equal intervals, where the interval is four times (=5−1) as much as the marker element pitch MP.

Next, the five marker element pieces 57 of the marker element 52c for the second viewpoint are arranged along the same direction at the equal intervals of four times as much as the marker element pitch MP in such a way as to be shifted toward one of the two sides along their arrangement direction (here, rightward) by one marker element pitch MP with respect to the marker element pieces 56a, 56b, 56c, 56d, and 56e.

Third, the five marker element pieces 58a and 58b of the marker element 53c for the third viewpoint are arranged along the same direction at the equal intervals of four times as much as the marker element pitch MP in such a way as to be shifted toward one of the two sides along their arrangement direction (here, rightward) by one marker element pitch MP with respect to the marker element pieces 57.

Fourth, the five marker element pieces 59a and 59b of the marker element 54c for the fourth viewpoint are arranged along the same direction at the equal intervals of four times as much as the marker element pitch MP in such a way as to be shifted toward one of the two sides along their arrangement direction (here, rightward) by one marker element pitch MP with respect to the marker element pieces 58a and 58b.

Finally, the five marker element pieces 60a, 60b and 60c of the marker element 55c for the fifth viewpoint are arranged along the same direction at the equal intervals of four times as much as the marker element pitch MP in such a way as to be shifted toward one of the two sides along their arrangement direction (here, rightward) by one marker element pitch MP with respect to the marker element pieces 59a and 59b.

In this way, the marker element pieces 60a, 60b, and 60c, 59a and 59b, 58a and 58b, 57, 56a to 56e of the marker elements 55c, 54c, 53c, 52c and 51c are alternately arranged one by one along the same direction, resulting in the marker 50 having the pattern of FIG. 16.

The repetition cycle MC is in accordance with the width of the semicylindrical lens element 6 of the lenticular lens 2, and one-fifth (⅕) of the marker element piece repetition cycle MC is set as the marker element pitch MP. The marker element piece number MG included in the marker 50 is twenty five. This means that the relationships of MC=5 MP and MG=5MC=25 MP are established.

Similar to the markers 4 according to the aforementioned first embodiment, the markers 50 according to the fourth embodiment are arranged in the non-display region 21 at equal intervals along the side parallel to the longitudinal direction of the semicylindrical lens elements 6, where the markers 50 are respectively located at three positions, i.e., the upper, middle, and lower positions, of the aforementioned side (see FIG. 9). The marker 50 is formed in the non-display region 21 of the display panel 3 using a known photolithography or printing method in such a way as not to overlap with the display region 20.

In a method of fabricating the display device 61 according to the fourth embodiment, when an image of each marker 30 formed on the display panel 3 is picked up with the camera C by way of the lenticular lens 2 at the predetermined visual recognition distance A, one of the synthesized images 62a, 62b, 62c, 62d, and 62e shown in FIGS. 17A to 17E is visually recognized. By utilizing the synthesized images 62a, 62b, 62c, 62d, and 62e, the lenticular lens 2 can be aligned in position to the display panel 3 and attached on the panel 3 at the desired position.

Figure 17:
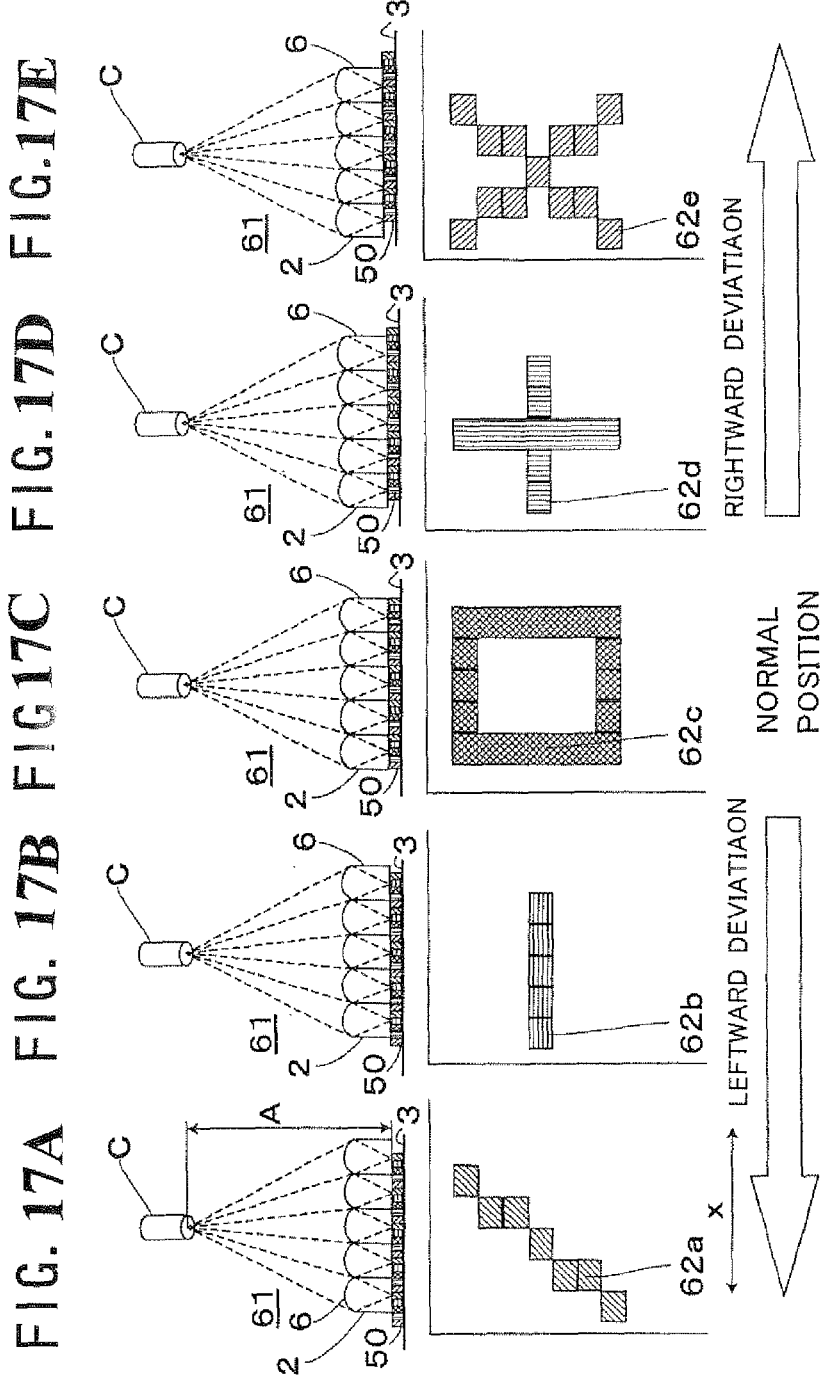
FIGS. 17A to 17E are explanatory illustrations showing a method of fabricating a display device according to the fourth embodiment of the present invention, respectively, wherein the positional relationship between a lenticular lens and an alignment marker, and a synthesized image generated by picking up an image of the alignment marker on a display panel by way of the lenticular lens are shown.

If the lenticular lens 2 is located at the desired position (i.e., the optimum position) on the display panel 3, the synthesized image 62c of the marker 50 shown in FIG. 17C is generated. This image 5c comprises two straight lines extending vertically and two straight lines extending laterally, forming a rectangular frame-shaped pattern as a whole. The pattern of the image 62c is approximately the same as the marker element 53a shown in FIG. 15A.

If the display panel 3 is slightly deviated in position leftward with respect to the lenticular lens 2, the synthesized image 62b of the marker 50 shown in FIG. 17B is generated. This image 62b has a pattern comprising a single straight line extending laterally. The pattern of the image 62b is approximately the same as the marker element 52a shown in FIG. 15A.

If the display panel 3 is deviated in position leftward furthermore with respect, to the lenticular lens 2, the synthesized image 62a of the marker 50 shown in FIG. 17A is generated. This image 62a has a pattern comprising a single stepped oblique line whose plan shape is like stairs, where small rectangular boxes are combined together. The oblique line extends from the lower left position of the initial region to the upper right position thereof. The pattern of the image 62a is approximately the same as the marker element 51a shown in FIG. 15A.

On the contrary, if the display panel 3 is slightly deviated in position rightward with respect to the lenticular lens 2, the synthesized image 62d of the marker 50 shown in FIG. 17D is generated. This image 62d has a pattern comprising a straight line extending laterally and a straight line extending vertically, forming a cross shape as a whole. The pattern of the image 62d is approximately the same as the marker element 54a shown in FIG. 15A.

If the display panel 3 is deviated in position rightward furthermore with respect to the lenticular lens 2, the synthesized image 62e of the marker 50 shown in FIG. 17E is generated. This image 62e has a pattern comprising two stepped oblique lines, where small rectangular boxes are combined together. One of the two oblique lines extends from the lower left position of the initial region to the upper right position thereof and the other oblique line extends from the upper left position of the initial region to the lower right position thereof. The pattern of the image 62e is approximately the same as the marker element 55a shown in FIG. 15A.

Because the synthesized images 62a, 62b, 62c, 62d, and 62e shown in FIGS. 17A to 17E are clearly different from each other, they can be discriminated easily. Therefore, in the aligning and bonding operation of the display panel 3 and the lenticular lens 2, the direction and quantity of the positional deviation of the panel 3 with respect to the lens 2 can be perceived by intuition according to which one of the synthesized images 62a, 62b, 62c, 62d, and 62e is recognized.

As explained above, with the display device 61 according to the fourth embodiment, each of the three alignment markers 50 formed on the display panel 3 is formed by the combination of the marker element 51c, 52c, 53c, 54c, and 55c for the first to fifth viewpoints, and is formed by the same method as the marker 4 of the first embodiment. Therefore, the device 61 of the fourth embodiment has the same advantages as those of the device 1 of the first embodiment.

In addition, the marker 50 of the fourth embodiment is formed by the five marker elements 51c, 52c, 53c, 54c, and 55c and therefore, the positional alignment accuracy is somewhat higher than the aforementioned first embodiment comprising the three marker elements 10c, 11c, and 12c. However, the structure of the marker 50 is complicated compared with that of the marker 4 of the first embodiment. Therefore, the productivity is somewhat lowered.

Fifth Embodiment

Figure 18:
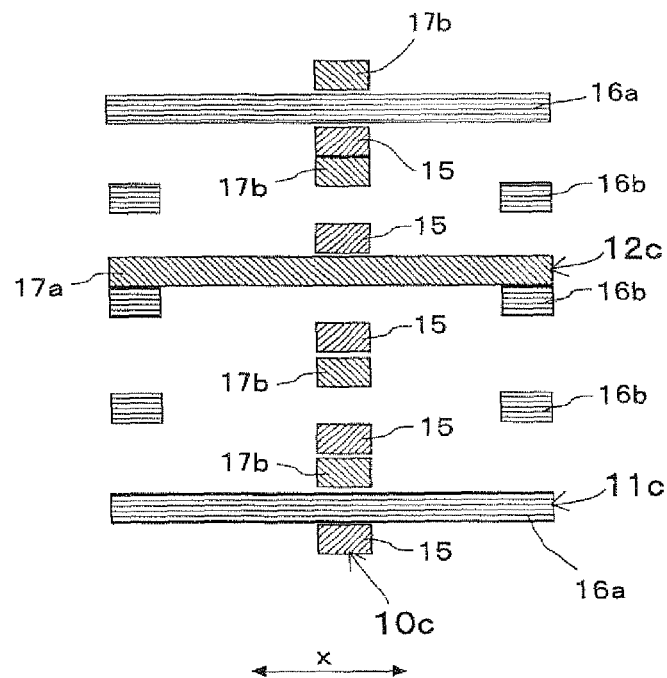
FIG. 18 is a plan view showing the structure of an alignment marker according to a fifth embodiment of the present invention.

FIG. 18 is a plan view showing a marker 70 according to a fifth embodiment of the present invention, where the same reference numerals are attached to the same elements as those of the alignment marker 4 according to the above-described first embodiment of FIG. 7D.

The marker 70 has a structure obtained by rotating the marker 4 of the first embodiment rightward by 90°. Specifically, with the marker 4 of the first embodiment, the marker elements 10c, 11c, and 12c for the first, second, and third viewpoints are arranged along the image separation direction x of the lenticular lens 2 (in other words, the marker element pieces 12c are perpendicular to the direction x). Unlike this, with the marker 70 of the fifth embodiment, the marker elements 10c, 11c, and 12c for the first, second, and third viewpoints are arranged along the direction perpendicular to the image separation direction x of the lens 2 (in other words, the marker element pieces 12c are parallel to the direction x).

The marker 70 is used in combination with one of the aforementioned markers 4, 30, 40, and 50 according to the first to fourth embodiments. For example, in the case where the marker 70 is used in combination with the marker 4 of the first embodiment, three (or four or more) markers 4 are arranged in the part of the non-display region 21 of the display panel 3 which is perpendicular to the image separation direction x (in other words, in the part located at the left or right side of the display region 20), as shown in FIG. 9. On the other hand, three (or four or more) markers 70 are arranged in the part of the non-display region 21 of the panel 3 which is parallel to the image separation direction x (in other words, in the part located at the upper or lower side of the display region 20) in FIG. 9.

Figure 19:
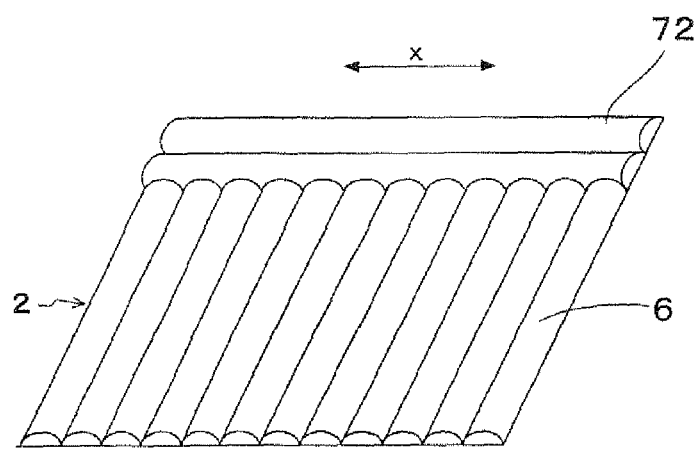
FIG. 19 is a schematic perspective view showing the structure of a lenticular lens used in a method of fabricating a display device according to the fifth embodiment of the present invention.

With the display device according to the fifth embodiment (not shown), a lenticular lens 71 shown in FIG. 19 is used instead of the lenticular lens 2 shown in FIG. 8. The lenticular lens 71 has a structure obtained by adding semicylindrical lenses 72 to the structure of the lenticular lens 2 used in the first embodiment. The semicylindrical lenses 72 are perpendicular to the semicylindrical lens elements 6 (which are parallel to the image separation direction x) forming the lenticular lens 2. The correspondence relationship between the marker 70 and the lens 72 is the same as that shown in FIG. 8.

In the case where the markers 70 are formed on the display panel 3 in combination with the markers 4 of the first embodiment and the lenticular lens 71 shown in FIG. 18 is used, when an image of each marker 70 formed on the panel 3 is picked up with the camera C by way of the lenticular lens 71 at the predetermined visual recognition distance A, one of the synthesized images 5a, 5b, 5c, 5d, and 5e shown in FIGS. 6A to 6E is visually recognized. For this reason, similar to the aforementioned first embodiment, the direction and quantity of the positional deviation of the panel 3 with respect to the lens 2 along the image separation direction x can be perceived by the markers 4 and the lens 2 and at the same time, those along the direction perpendicular to the image separation direction x can be perceived by the markers 70 and the lens 72.

In this way, with the display device of the fifth embodiment, positional alignment between the lenticular lens 2 and the display panel 3 along the image separation direction x and the perpendicular direction thereto can be performed simultaneously.

In addition, if only the markers 70 are provided in the part of the non-display region 21 on the upper or lower side of the display region 20, the picture frame region of the display panel 3 can be narrowed furthermore on the upper or lower side of the display panel 3.

In the case where the markers 70 are formed on the display panel 3 in combination with the markers 30, 40, or 50 of the second, third, or fourth embodiment, the same advantages are obtained.

Other Embodiments

Since the above-described first to fifth embodiments are preferred examples of the present invention, it is needless to say that the present invention is not limited to these embodiments. Any other modification is applicable to these embodiments.

For example, in the above-described first to fifth embodiments, the lenticular lens 2 or 71 comprising a plurality of cylindrical lens elements 6 or 72 aligned is used as the optical image separation element. However, the present invention is not limited to this and any other optical image separation element may be used. For example, a fly-eye lens sheet comprising a plurality of fly-eye lens aligned, a parallax barrier sheet comprising a plurality of parallax barriers, and so on may be used.

In the case where a fly-eye lens sheet is used, the markers may be formed in the non-display region 21 of the display panel 3 at three or more positions along the side parallel to the image separation direction of the fly-eye lenses. In the case where a parallax barrier sheet is used, the markers may be formed in the non-display region 21 of the display panel 3 at three or more positions along the side parallel to the longitudinal direction of the parallax barriers.

Moreover, in the above-described first to third and fifth embodiments, the marker element 10c for the first viewpoint, the marker element 11c for the second viewpoint, and the marker element 12c for the third viewpoint are divided into strip-like pieces in such a way as to have widths equal to the predetermined marker element pitch MP. However, the present invention is not limited to this. The marker element 10c, 11c and 12c may be divided into strip-like pieces in such a way as to have widths unequal to the predetermined marker element pitch MP.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A marker designed to be formed on a display panel for positional alignment between an optical image separation element and the display panel in a fabrication process of a display device comprising the optical image separation element and the display panel, the marker comprising:
   first marker element pieces for a first viewpoint, which are formed by dividing a first marker element for the first viewpoint in such a way as to have widths equal to a predetermined marker element pitch; and
   second marker element pieces for a second viewpoint, which are formed by dividing a second marker element for the second viewpoint in such a way as to have widths equal to the marker element pitch,
   wherein the first marker element and the second marker element are different in plan shape from each other,
   the first marker element pieces and the second marker element pieces are arranged in a predetermined order at the marker element pitch along an optical image separation direction of the optical image separation element, thereby forming a pattern,
   a predetermined number of the first marker element pieces and the second marker element pieces adjoining to each other constitute one repetition cycle, a width of the repetition cycle being in accordance with an arrangement pitch of constituent elements of the optical image separation element, and
   each of the first marker element piece and the second marker element piece is obtained by scaling down its initial plan shape (1/a number of the first and second marker element pieces included in the repetition cycle) along the optical image separation direction.

2. A display device that displays different images for different viewpoints, comprising:
   a display panel;
   the markers according to claim 1, which is formed on the display panel; and
   an optical image separation element attached to the display panel,
   wherein the markers are arranged at three or more positions in a non-display region of the display device along a direction perpendicular to the optical image separation direction.

3. A display device that displays different images for different viewpoints, comprising:
   a display panel;
   the markers according to claim 1, which is formed on the display panel; and an optical image separation element attached to the display panel, wherein the optical image separation element comprises:
structural elements arranged along the image separation direction, and
an additional structural element whose optical image separation direction is perpendicular to the optical image separation direction of the optical image separation element, and the display panel comprises an additional marker obtained by rotating the marker by an angle of 90° in a plane parallel to the display panel.

4. A method of fabricating a display device that displays different images for different viewpoints, comprising:
forming the marker according to claim 1 at a predetermined position on the display panel;
performing positional alignment between the display panel and an optical image separation element by utilizing an image of the marker visually recognized by way of the optical image separation element; and
fixing the optical image separation element on the display panel after completion of the positional alignment,
wherein the markers are arranged at three or more positions in a non-display region of the display device along a direction perpendicular to the optical image separation direction.

5. A method of fabricating a display device that displays different images for different viewpoints, comprising:
forming the marker according to claim 1 at a predetermined position on the display panel;
performing positional alignment between the display panel and an optical image separation element by utilizing an image of the marker visually recognized by way of the optical image separation element; and
fixing the optical image separation element on the display panel after completion of the positional alignment,
wherein the optical image separation element comprises:
structural elements arranged along the image separation direction, and
an additional structural element whose optical image separation direction is perpendicular to the optical image separation direction of the optical image separation element, and
the display panel comprises an additional marker obtained by rotating the marker by an angle of 90° in a plane parallel to the display panel.

6. A marker designed to be formed on a display panel for positional alignment between an optical image separation element and the display panel in a fabrication process of a display device comprising the optical image separation element and the display panel, the marker comprising:
first marker element pieces for a first viewpoint, which are formed by dividing a first marker element for the first viewpoint in such a way as to have widths equal to a predetermined marker element pitch;
second marker element pieces for a second viewpoint, which are formed by dividing a second marker element for the second viewpoint in such a way as to have widths equal to the marker element pitch; and
third marker element pieces for a third viewpoint,
wherein the first marker element and the second marker element are different in plan shape from each other,
the first marker element pieces and the second marker element pieces are arranged in a predetermined order at the marker element pitch along an optical image separation direction of the optical image separation element, thereby forming a pattern,
a predetermined number of the first marker element pieces and the second marker element pieces adjoining to each other constitute one repetition cycle, a width of the repetition cycle being in accordance with an arrangement pitch of constituent elements of the optical image separation element,
the third marker element pieces are formed by dividing a third marker element for the third viewpoint,
the first marker element pieces, the second marker element pieces, and the third marker element pieces are arranged along the optical image separation direction, thereby forming the pattern,
one of the first marker element pieces, one of the second marker element pieces, and one of the third marker element pieces, which are adjacent to each other, constitute the repetition cycle, and
each of the first marker element piece, the second marker element piece, and the third marker element piece is obtained by scaling down its initial plan shape (1/a number of the first, second, and third marker element pieces included in the repetition cycle) along the optical image separation direction.

7. A display device that displays different images for different viewpoints, comprising:
a display panel;
the markers according to claim 6, which is formed on the display panel; and
an optical image separation element attached to the display panel,
wherein the markers are arranged at three or more positions in a non-display region of the display device along a direction perpendicular to the optical image separation direction.

8. A display device that displays different images for different viewpoints, comprising:
a display panel;
the markers according to claim 6, which is formed on the display panel; and
an optical image separation element attached to the display panel,
wherein the optical image separation element comprises:
structural elements arranged along the image separation direction, and
an additional structural element whose optical image separation direction is perpendicular to the optical image separation direction of the optical image separation element, and
the display panel comprises an additional marker obtained by rotating the marker by an angle of 90° in a plane parallel to the display panel.

9. A method of fabricating a display device that displays different images for different viewpoints, comprising:
forming the marker according to claim 6 at a predetermined position on the display panel;
performing positional alignment between the display panel and an optical image separation element by utilizing an image of the marker visually recognized by way of the optical image separation element; and
fixing the optical image separation element on the display panel after completion of the positional alignment,
wherein the markers are arranged at three or more positions in a non-display region of the display device along a direction perpendicular to the optical image separation direction.

10. A method of fabricating a display device that displays different images for different viewpoints, comprising:

forming the marker according to claim 6 at a predetermined position on the display panel;

performing positional alignment between the display panel and an optical image separation element by utilizing an image of the marker visually recognized by way of the optical image separation element; and fixing the optical image separation element on the display panel after completion of the positional alignment, wherein the optical image separation element comprises:
  structural elements arranged along the image separation direction, and
  an additional structural element whose optical image separation direction is perpendicular to the optical image separation direction of the optical image separation element, and the display panel comprises an additional marker obtained by rotating the marker by an angle of 90° in a plane parallel to the display panel.

\* \* \* \* \*